(12) United States Patent
Kamisuki

(10) Patent No.: US 12,009,882 B2
(45) Date of Patent: Jun. 11, 2024

(54) SIMULATION DEVICE, SIMULATION METHOD, AND RECORDING MEDIUM

(71) Applicant: Socionext Inc., Kanagawa (JP)

(72) Inventor: Koji Kamisuki, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 368 days.

(21) Appl. No.: 17/570,056

(22) Filed: Jan. 6, 2022

(65) Prior Publication Data

US 2022/0255584 A1  Aug. 11, 2022

(30) Foreign Application Priority Data

Feb. 5, 2021 (JP) ................... 2021-017210

(51) Int. Cl.
*H04B 3/40* (2006.01)
*H04B 3/54* (2006.01)
(Continued)

(52) U.S. Cl.
CPC ............... *H04B 3/40* (2013.01); *H04B 3/54* (2013.01); *H04B 17/0087* (2013.01); *H04B 17/336* (2015.01)

(58) Field of Classification Search
CPC . H04B 3/40; H04B 3/54; H04B 3/542; H04B 3/544; H04B 3/546; H04B 3/548; H04B 3/56; H04B 17/0087; H04B 17/336
(Continued)

(56) References Cited

U.S. PATENT DOCUMENTS

| 7,627,402 B2* | 12/2009 | Mollenkopf ........... H04B 3/542 701/1 |
| 11,863,247 B2* | 1/2024 | Barois .................... H04B 3/544 |
| 2018/0343173 A1 | 11/2018 | Yamauchi et al. |

FOREIGN PATENT DOCUMENTS

| JP | H07-87557 A | 3/1995 |
| JP | 2000-333239 A | 11/2000 |
| JP | 2018-200503 A | 12/2018 |

OTHER PUBLICATIONS

Mikio Mizutani,"Research on faster power line communication method in home network", Kyushu Institute of Technology, Doctoral Degree Thesis, 2014; available online: http://hdl.handle.net/10228/5267; with partial English translation.
(Continued)

*Primary Examiner* — Hai L Nguyen
(74) *Attorney, Agent, or Firm* — Rimon P.C.

(57) ABSTRACT

A simulation device includes: a layout setting unit which sets a layout of a power line communication (PLC) network; a parameter setting unit which sets an electrical parameter of the PLC network; a simulation execution unit; and a result output unit which outputs an electrical property obtained by the simulation. The layout setting unit includes: an information obtaining unit which obtains structure information indicating a structure of a building where the PLC network is to be provided and position information of one or more elements included in the PLC network; and a display information output unit which displays, on a display unit that displays information that relates to the PLC network, a diagram that is based on the structure information, and displays at least a portion of the PLC network that is based on the position information such that the portion is superimposed on the diagram.

12 Claims, 22 Drawing Sheets

(51) Int. Cl.
    *H04B 17/00*     (2015.01)
    *H04B 17/336*    (2015.01)
(58) Field of Classification Search
    USPC .......................................................... 333/183
    See application file for complete search history.

(56) References Cited

OTHER PUBLICATIONS

Tooraj Esmailian et al. "In-building power lines as high-speed communication channels: channel characterization and a test channel ensemble", May 12, 2003, International Journal of Communication Systems, 2003; 16, pp. 381-400.

Bernhard Gäde, Andreas M. Lehmann, Jorg Deutschmann, and Johannes B. Huber, "A Power Line Communication Topology Module for ns-3 and DCE", IEEE International Conference on Smart Grid Communications, Dresden, Germany, Oct. 23-26, 2017, pp. 295-301.

Fariba Aalamifar, et al., "Modelling Power Line Communication Using Network Simulator-3", 2013 IEEE Global Communications Conference (GLOBECOM) Symposium on Selected Areas in Communications, pp. 2969-2974.

* cited by examiner

FIG. 9

| Power line ID | Wiring position (start point) | Wiring position (end point) | Power line model ID |
|---|---|---|---|
| WR0001 | (31, 55, 52) | (12, 44, 5) | WM001 |
| WR0002 | (31, 55, 52) | (55, 11, 20) | WM001 |

FIG. 11

| Electrical device ID | Layout position | Electrical device model ID |
|---|---|---|
| DV000 | (49, 13, 5) | DM001 |
| DV001 | (29, 10, 20) | PLC000 |

FIG. 15

| Branch ID | Power line length | Connection 1 | Connection 2 | Power line model ID |
|---|---|---|---|---|
| BR001 | 23 | DM001 | BR002 | WM001 |
| BR002 | 11 | DM002 | BR001 | WM001 |

FIG. 16

| Power line model ID | A | B | C | D |
|---|---|---|---|---|
| WM001 | A001 | B001 | C001 | D001 |
| WM002 | A002 | B002 | C002 | D002 |

FIG. 17

| Device model ID | Device type | Impedance | S parameter | Noise expression |
|---|---|---|---|---|
| DM000 | Air conditioner | X000 | None | None |
| DM001 | Television | None | S002 | Z002 |
| PLC001 | PLC device | X002 | None | None |

FIG. 18

| PLC model ID | Power control ID | Master/terminal | Multi-hop ON/OFF | Delay |
|---|---|---|---|---|
| PLC000 | PW001 | Master | ON | 3 |
| PLC001 | PW003 | Terminal | OFF | 1 |

FIG. 19

| Power control ID | Carrier 1 | Carrier 2 | Carrier 3 | ... |
|---|---|---|---|---|
| PW001 | 40 | 40 | 45 | ... |
| PW002 | 40 | 40 | 40 | ... |

FIG. 21

< Set simulation conditions >

Simulation algorithm

◉ Signal lumped RLC model in which PLC network is approximated by lumped constant circuit
○ Calculation in which F matrix is cascade connected and accumulated
○ Branch model attenuation estimation (BMAE)

Required throughput : All nodes 50Mbps

FIG. 22

| Result ID | Simulation condition ID | SNRID | Throughput ID |
|---|---|---|---|
| S001 | CD001 | SN001 | TH001 |
| S002 | CD002 | SN002 | TH002 |

FIG. 23

| SNRID | Communication device | Signal table [dBm] | | | | Noise table [dBm] | | | |
|---|---|---|---|---|---|---|---|---|---|
| | | Frequency: f01 | Frequency: f02 | Frequency: fXX | Frequency: f390 | Frequency: f01 | Frequency: f01 | Frequency: fXX | Frequency: f390 |
| SN001 | PLC001, PLC002 | -44 | -45 | -23 | -35 | -65 | -64 | -66 | -63 |
| SN001 | PLC002, PLC003 | -48 | -50 | -25 | -55 | -63 | -65 | -64 | -63 |
| ... | ... | ... | ... | ... | ... | ... | ... | ... | ... |
| SN002 | PLC001, PLC002 | -58 | -55 | -25 | -48 | -65 | -64 | -61 | -64 |
| SN002 | PLC002, PLC003 | -48 | -50 | -25 | -48 | -64 | -64 | -58 | -62 |

FIG. 24

| Throughput ID | Communication device | Throughput |
|---|---|---|
| TH001 | PLC001, PLC002 | 30 |
| TH001 | PLC002, PLC003 | 26 |
| ⋮ | ⋮ | ⋮ |
| TH002 | PLC001, PLC002 | 24 |

SIMULATION DEVICE, SIMULATION METHOD, AND RECORDING MEDIUM

CROSS REFERENCE TO RELATED APPLICATION

The present application is based on and claims priority of Japanese Patent Application No. 2021-017210 filed on Feb. 5, 2021. The entire disclosure of the above-identified application, including the specification, drawings and claims is incorporated herein by reference in its entirety.

FIELD

The present disclosure relates to a simulation device, a simulation method, and a recording medium.

BACKGROUND

Conventionally, a power line communication (PLC) which performs information communication using power lines has been used. In order to design and construct a power line communication network (hereinafter, also referred to as a PLC network), a technique has been proposed which estimates the electrical properties of the PLC network by simulations (for example, see Non Patent Literatures (NPTLs) 1 to 3).

CITATION LIST

Non Patent Literature

[NPTL 1] Mikio Mizutani, "Research on faster power line communication method in home network", Kyushu Institute of Technology, Doctoral Degree Thesis, 2014

[NPTL 2] Tooraj Esmailian, Frank R. Kschischang, and P. Glenn Gulak, "In-building power lines as high-speed communication channels: channel characterization and a test channel ensemble", INTERNATIONAL JOURNAL OF COMMUNICATION SYSTEMS, 2003; 16:381-400

[NPTL 3] Bernhard Gade, Andreas M. Lehmann, Jorg Deutschmann, and Johannes B. Huber, "A Power Line Communication Topology Module for ns-3 and DCE", IEEE International Conference on Smart Grid Communications 23-26 Oct. 2017, pp. 295-301

SUMMARY

Technical Problem

By designing a PLC network and using the simulation methods and the like described in NPTL 1 to NPTL 3, the electrical properties of the PLC network can be estimated. However, in order to design a PLC network suitable for a building, technical knowledge on PLC, electrical wiring, and architecture is required. Hence, simulating a PLC network suitable for a building is not easy.

The present disclosure has been conceived to solve such a problem. An object of the present disclosure is to provide, for example, a simulation device which is capable of easily executing simulations of a PLC network.

Solution to Problem

In order to achieve the above object, a simulation device according to one aspect of the present disclosure is a simulation device which calculates an electrical property of a power line communication (PLC) network. The simulation device includes: a layout setting unit which sets a layout of the PLC network; a parameter setting unit which sets an electrical parameter of the PLC network; a simulation execution unit which executes a simulation of the PLC network; and a result output unit which outputs the electrical property obtained by the simulation executed by the simulation execution unit. The layout setting unit includes an information obtaining unit which obtains structure information and position information, the structure information indicating a structure of a building where the PLC network is to be provided, the position information indicating a position of each of one or more elements included in the PLC network; and a display information output unit which displays, on a display unit that displays information that relates to the PLC network, a diagram that is based on the structure information, and displays at least a portion of the PLC network that is based on the position information such that the portion is superimposed on the diagram.

In order to achieve the above object, a simulation method according to one aspect of the present disclosure is a simulation method for calculating an electrical property of a power line communication (PLC) network. The simulation method includes: setting a layout of the PLC network; setting an electrical parameter of the PLC network; executing a simulation of the PLC network; and outputting the electrical property obtained by the executing of the simulation. The setting of the layout includes: obtaining structure information and position information, the structure information indicating a structure of a building where the PLC network is to be provided, the position information indicating a position of each of one or more elements included in the PLC network; and displaying a diagram that is based on the structure information and displaying at least a portion of the PLC network that is based on the position information such that the portion is superimposed on the diagram.

In order to achieve the above object, a non-transitory computer-readable recording medium according to one aspect of the present disclosure causes a computer to execute the simulation method described above.

Advantageous Effects

According to the present disclosure, it is possible to provide, for example, a simulation device which is capable of easily executing simulations of a PLC network.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 9 illustrates an example of position information and identification information of power lines according to the embodiment.

FIG. 11 illustrates an example of position information and identification information of the electrical devices according to the embodiment.

FIG. 15 is a graph illustrating a portion of a PLC network topology according to the embodiment.

FIG. 16 illustrates electrical parameters of power lines included in the PLC network stored in a parameter storage according to the embodiment.

FIG. 17 illustrates electrical parameters of electrical devices included in the PLC network stored in the parameter storage according to the embodiment.

FIG. 18 illustrates parameters set in the PLC devices stored in the parameter storage according to the embodiment.

FIG. 19 illustrates parameters of power control IDs stored in the parameter storage according to the embodiment.

FIG. 21 illustrates an example of an input method of the conditions for simulations according to the embodiment.

FIG. 22 illustrates an example of simulation results output by the simulation execution unit according to the embodiment.

FIG. 23 illustrates an example of signal-to-noise ratios (SNRs) included in the simulation results output by the simulation execution unit according to the embodiment.

FIG. 24 illustrates an example of throughputs included in the simulation results output by the simulation execution unit according to the embodiment.

DESCRIPTION OF EMBODIMENT

Figure 1:
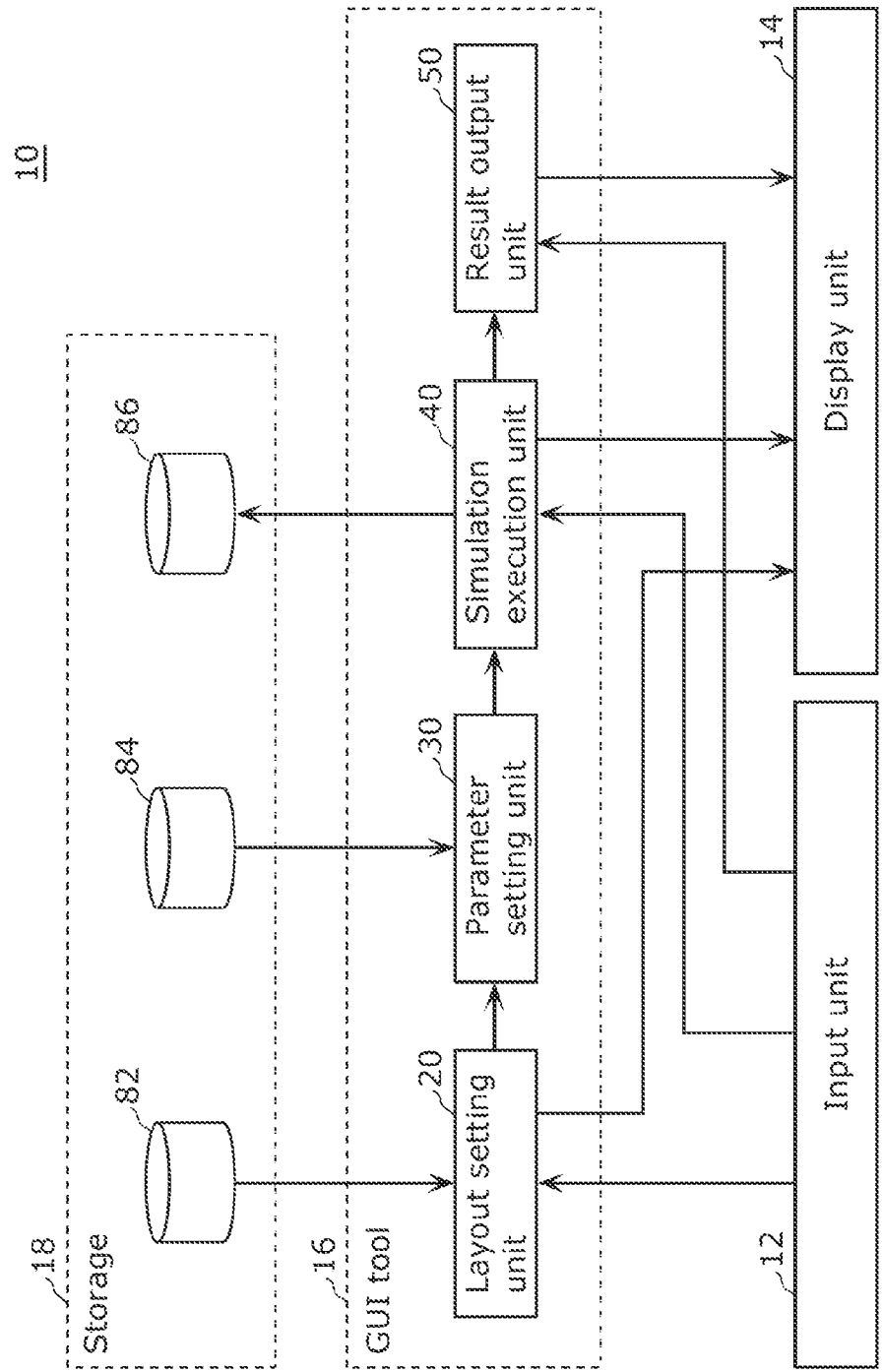
FIG. 1 is a block diagram schematically illustrating a functional configuration of a simulation device according to an embodiment.

Hereinafter, an embodiment of the present disclosure will be described with reference to the drawings. Note that the embodiment described below shows a specific example of the present disclosure. Numerical values, shapes, materials, specifications, structural elements, arrangement positions and connection forms of the structural elements, steps, order of steps, and the like indicated in the embodiment below are merely examples, and are not intended to limit the present disclosure. In addition, among the structural elements in the embodiment below, structural elements that are not described in independent claims indicating the highest concept of the present disclosure are described as optional structural elements. Note that the drawings are not necessarily precise illustrations. Like reference signs indicate like elements in the drawings, and overlapping descriptions thereof are omitted or simplified.

Embodiment

A simulation device and a simulation method according to an embodiment will be described.

[1. Configuration]

First, a configuration of a simulation device according to the present embodiment will be described with reference to FIG. 1. FIG. 1 is a block diagram schematically illustrating a functional configuration of simulation device 10 according to the present embodiment.

Simulation device 10 is a device which calculates electrical properties of a PLC network. As illustrated in FIG. 1, in functional terms, simulation device 10 includes graphical user interface (GUI) tool 16. In the present embodiment, simulation device 10 further includes input unit 12, display unit 14, and storage 18.

Input unit 12 is a device which inputs information necessary for simulations. As input unit 12, for example, an input device such as a keyboard or a mouse, or a communication device which receives a signal can be used.

Display unit 14 is a device which displays information that relates to the PLC network. Display unit 14 displays, for example, information necessary for simulations of PLC network configuration and the like, simulation results, diagrams of the structure of a building where the PLC network is to be provided. As display unit 14, for example, a liquid crystal display panel, or an organic electro-luminescent (EL) display panel can be used.

Storage 18 is a storage device which stores information that relates to simulations. Storage 18 stores, for example, parameters to be used in simulations, and simulation result data. In the present embodiment, storage 18 includes input data storage 82, parameter storage 84, and result storage 86.

Input data storage 82 stores information necessary for setting the layout of the PLC network to be used in simulations. Input data storage 82 stores, for example, structure information indicating the structure of a building where the PLC network is to be provided, and position information of one or more elements included in the PLC network. The structure information includes information indicating the shape and size of at least a portion of the building. The structure information includes, for example, information corresponding to the floor plan and the like of the building. The position information includes, for example, information corresponding to an electrical wiring system diagram. The structure information and the position information may be combined. For example, information in which the floor plan and the electrical wiring system diagram are combined may be stored in input data storage 82 as the structure information and the position information.

Parameter storage 84 stores parameters to be used in simulations. In the present embodiment, parameter storage 84 stores electrical parameters of one or more elements included in the PLC network. Specifically, parameter storage 84 stores one or more items of identification information respectively corresponding to the one or more elements. Parameter storage 84 also stores electrical parameters of the one or more elements respectively associated with the one or more items of identification information.

Result storage 86 stores simulation result data. Result storage 86 stores, for example, transmission characteristics and throughput of the PLC network obtained by simulations.

GUI tool 16 is a processor which displays information that relates to the simulations on display unit 14, and executes simulations. GUI tool 16 includes layout setting unit 20, parameter setting unit 30, simulation execution unit 40, and result output unit 50.

Figure 2:
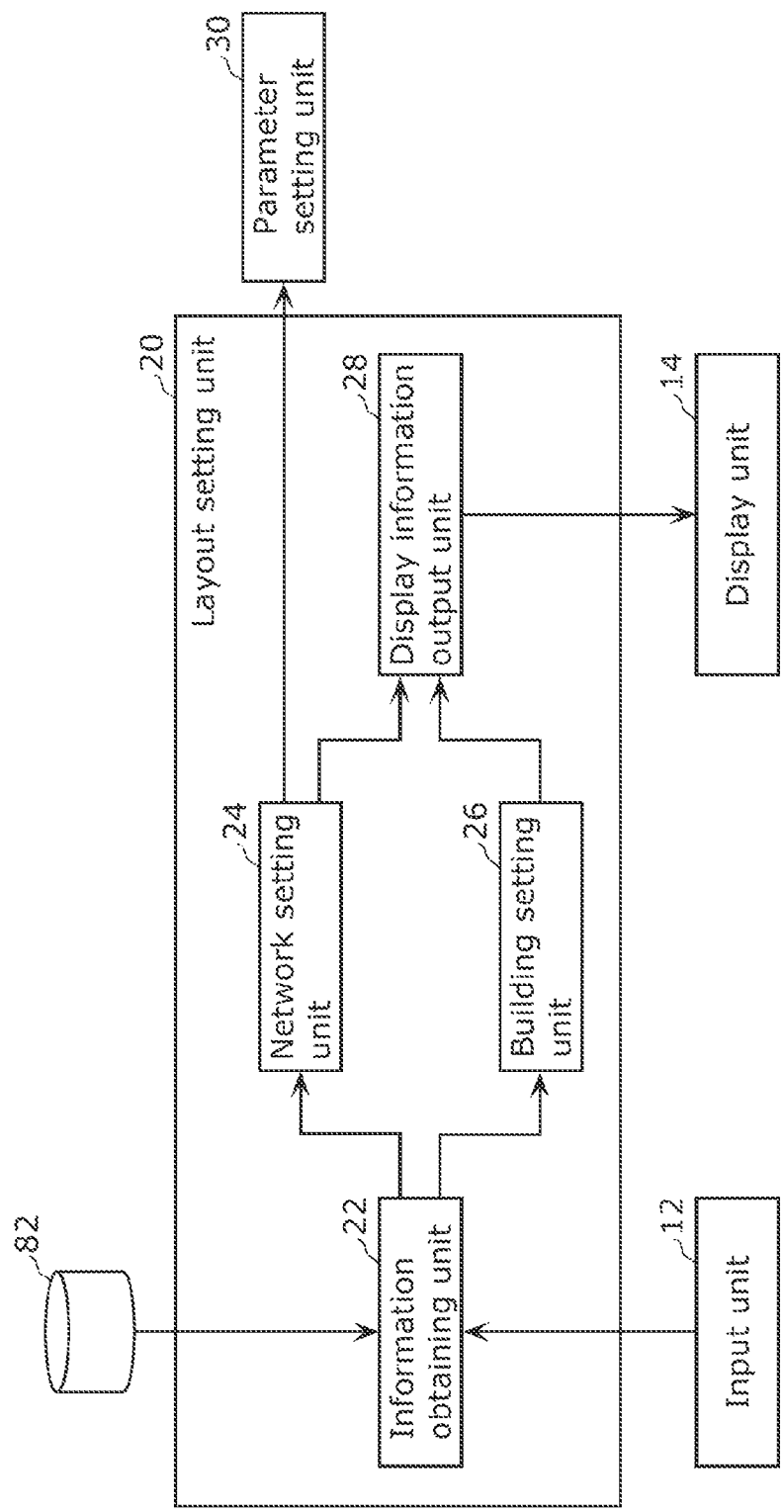
FIG. 2 is a block diagram illustrating a functional configuration of a layout setting unit according to the embodiment.

Layout setting unit 20 is a processor which sets the layout of the PLC network. Layout setting unit 20 sets the layout of the PLC network based on the information input from input unit 12. Layout setting unit 20 will be described with reference to FIG. 2. FIG. 2 is a block diagram illustrating a functional configuration of layout setting unit 20 according to the present embodiment. FIG. 2 also illustrates input unit 12, display unit 14, input data storage 82, and parameter setting unit 30. As illustrated in FIG. 2, layout setting unit 20 includes information obtaining unit 22, network setting unit 24, building setting unit 26, and display information output unit 28.

Information obtaining unit 22 obtains structure information indicating the structure of a building where the PLC network is to be provided and position information of one or more elements included in the PLC network. The one or more elements include one or more power lines. The one or more elements may include one or more electrical devices. The position information of the one or more power lines include information corresponding to the layout and length of each of the one or more power lines. For example, the position information of the one or more power lines may include coordinates of the end and via points of the one or more power lines. The one or more electrical devices may include one or more power line communication devices which perform power line communication (hereinafter, also referred to as "PLC devices"), and one or more home appliances which do not perform power line communication.

Information obtaining unit 22 obtains one or more items of identification information respectively corresponding to the one or more elements included in the PLC network. Specifically, information obtaining unit 22 obtains identification information, such as a product name and a model number, for identifying each element, such as a power line, a PLC device, and a home appliance included in the PLC network.

Information obtaining unit 22 may obtain information from input unit 12 or from input data storage 82. Information obtaining unit 22 may also obtain information stored in input data storage 82 based on an instruction from input unit 12. For example, input unit 12 may instruct information obtaining unit 22 to obtain specific structure information stored in input data storage unit 82. Input unit 12 may also instruct information obtaining unit 22 to obtain information corresponding to the electrical wiring system diagram stored in input data storage 82 as position information. In such a manner, the position information may include information corresponding to the electrical wiring system diagram. Information obtaining unit 22 outputs the obtained position information of the one or more power lines and position information of the one or more electrical devices to network setting unit 24. Information obtaining unit 22 also outputs the obtained structure information to building setting unit 26.

Network setting unit 24 sets the configuration of the PLC network based on the position information of the one or more elements included in the PLC network obtained by information obtaining unit 22. In other words, network setting unit 24 determines the layout of the one or more elements included in the PLC network and a connection relationship between each of the one or more elements and another element. Network setting unit 24 outputs the information of the set PLC network to display information output unit 28 and parameter setting unit 30.

Building setting unit 26 sets the structure of a building where the PLC network is to be provided, based on the structure information obtained by information obtaining unit 22. For example, building setting unit 26 determines the floor plan of the building where the PLC network is to be provided. Building setting unit 26 outputs the information of the set building structure to display information output unit 28.

Display information output unit 28 displays, on display unit 14 that displays information that relates to the PLC network, a diagram that is based on the structure information, and displays at least a portion of the PLC network that is based on the position information such that the portion is superimposed on the diagram. For example, display information output unit 28 displays, on display unit 14, a diagram that is based on the structure information of the building input from building setting unit 26. The diagram that is based on the structure information includes, for example, the floor plan of the building. Display information output unit 28 also displays at least a portion of the PLC network so as to be superimposed on the floor plan, based on the PLC network information input from network setting unit 24.

Figure 3:
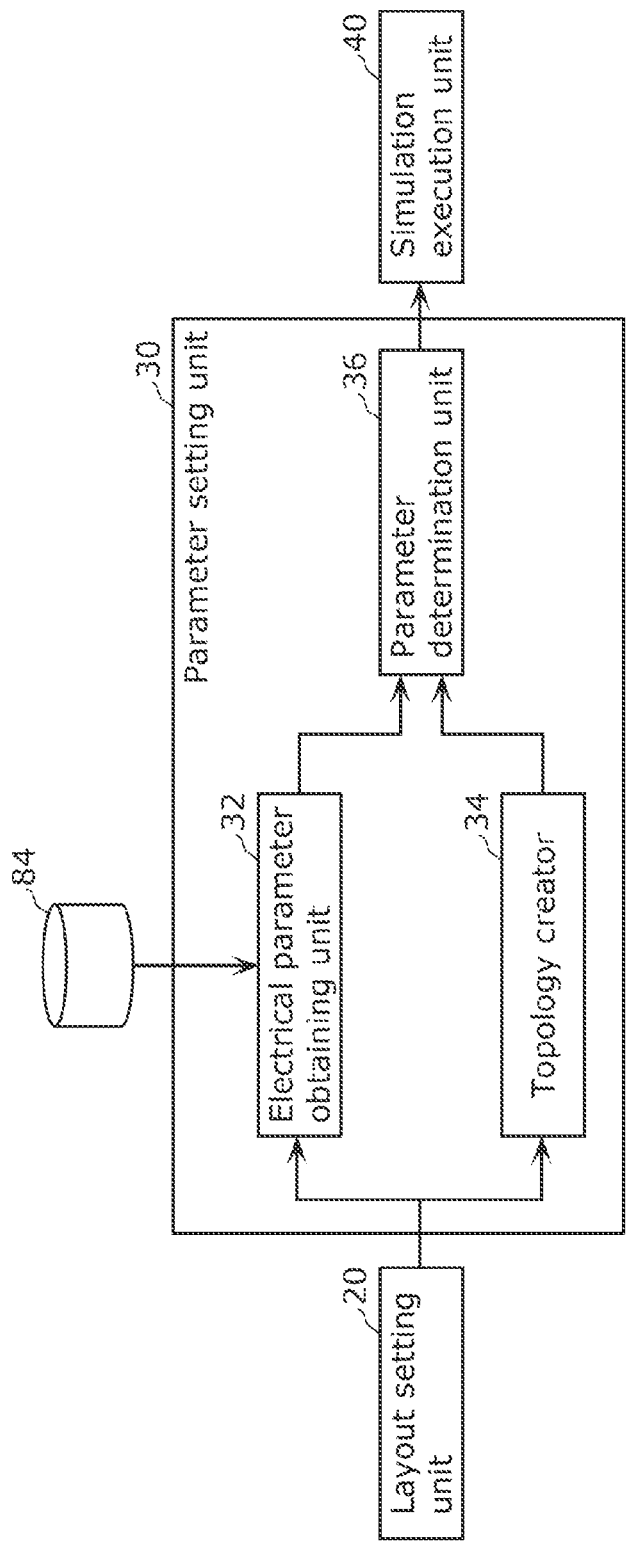
FIG. 3 is a block diagram illustrating a functional configuration of a parameter setting unit according to the embodiment.

Parameter setting unit 30 illustrated in FIG. 1 is a processor which sets electrical parameters of the PLC network. Parameter setting unit 30 sets electrical parameters of each of the one or more elements included in the PLC network set by layout setting unit 20. More specifically, parameter setting unit 30 sets the electrical parameters of the one or more elements obtained from parameter storage 84 as electrical parameters of the PLC network, based on the one or more items of identification information obtained by layout setting unit 20. Parameter setting unit 30 will be described with reference to FIG. 3. FIG. 3 is a block diagram illustrating a functional configuration of parameter setting unit 30 according to the present embodiment. FIG. 3 also illustrates layout setting unit 20, parameter storage 84, and simulation execution unit 40. As illustrated in FIG. 3, parameter setting unit 30 includes electrical parameter obtaining unit 32, topology creator 34, and parameter determination unit 36.

Electrical parameter obtaining unit 32 obtains electrical parameters of the one or more elements from parameter storage 84 based on the one or more items of identification information obtained by layout setting unit 20.

Topology creator 34 creates a PLC network topology based on the information that relates to the layout of the PLC network set by layout setting unit 20. Specifically, topology creator 34 creates a topology which includes the length of each branch of the PLC network including power lines and connection relationship between each branch and another branch, based on information that relates to the PLC network layout.

Parameter determination unit 36 determines parameters to be used in simulations, based on the electrical parameters obtained by electrical parameter obtaining unit 32 and the PLC network topology created by topology creator 34. Parameter determination unit 36 outputs the determined parameters to simulation execution unit 40.

Simulation execution unit 40 illustrated in FIG. 1 is a processor which executes simulations of the PLC network. Simulation execution unit 40 may execute simulations based on a plurality of algorithms that can be used in the simulations of the PLC network. Simulation execution unit 40 may execute a simulation based on, for example, a designated one of the algorithms. Examples of the algorithms that can be used in the PLC network include a signal lumped RLC model in which the PLC network is approximated by a lumped constant circuit, a calculation method in which F matrix is cascade connected and accumulated for calculation (see, for example, NPTL 2 and NPTL 3), and a branch model attenuation estimation (BMAE) (see, for example, NPTL 1).

Figure 4:
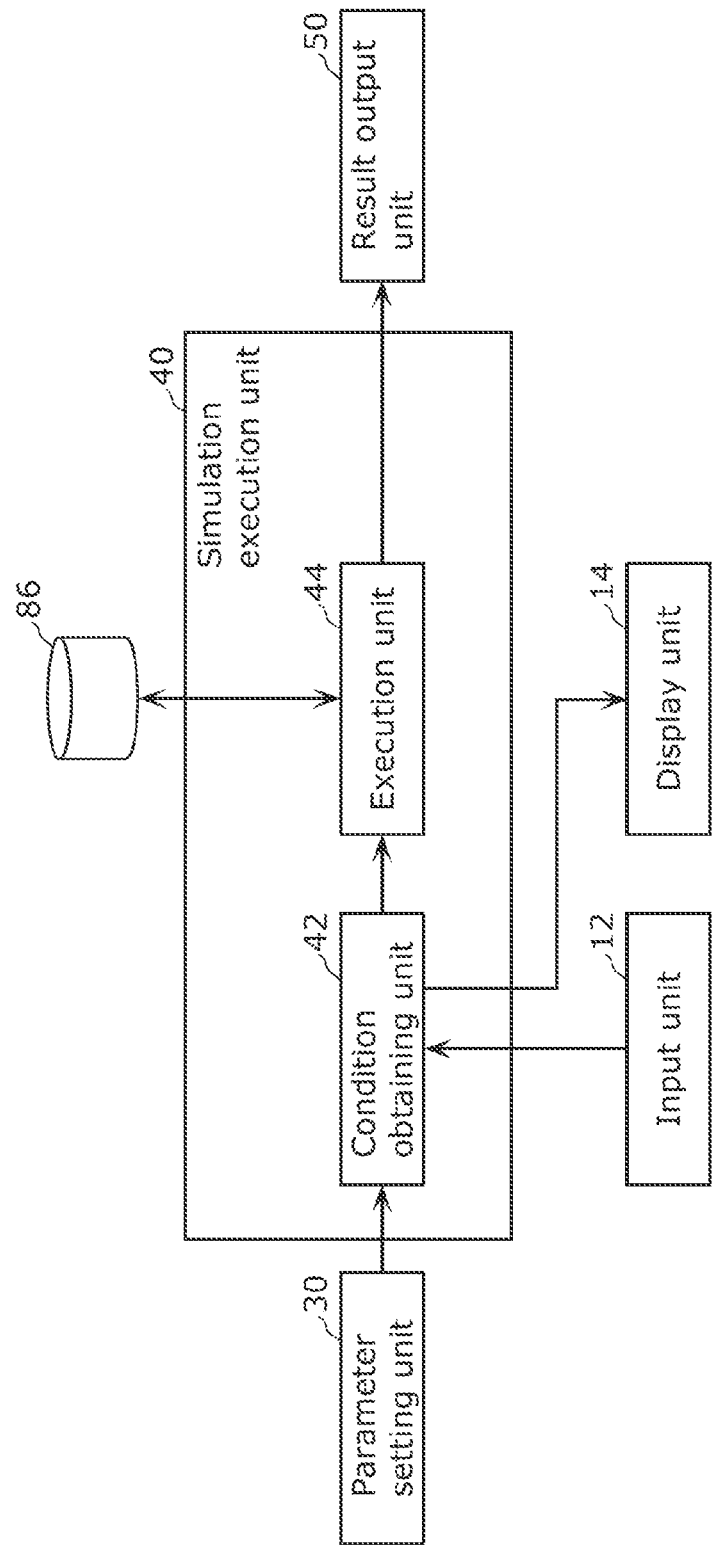
FIG. 4 is a block diagram illustrating a functional configuration of a simulation execution unit according to the embodiment.

Simulation execution unit 40 will be described with reference to FIG. 4. FIG. 4 is a block diagram illustrating a functional configuration of simulation execution unit 40 according to the present embodiment. FIG. 4 also illustrates input unit 12, display unit 14, result storage 86, parameter setting unit 30, and result output unit 50. As illustrated in FIG. 4, simulation execution unit 40 includes condition obtaining unit 42 and execution unit 44.

Condition obtaining unit 42 obtains parameters to be used in simulations from parameter setting unit 30. Condition obtaining unit 42 may obtain the conditions for simulations input from input unit 12. For example, condition obtaining unit 42 may obtain information that relates to the algorithm to be used in the simulations from input unit 12. In addition, condition obtaining unit 42 may display, for example, a plurality of algorithms that can be used in simulations on display unit 14. The user may use input unit 12 to designate one of the algorithms displayed on display unit 14. Condition obtaining unit 42 outputs information corresponding to the parameters and conditions to be used in the simulations to execution unit 44.

Execution unit 44 executes simulations with the parameters and conditions input from condition obtaining unit 42. Execution unit 44 outputs the simulation result to at least one of result storage 86 and result output unit 50. Specifically, execution unit 44 outputs the electrical properties of the PLC network obtained by the simulations.

Result output unit 50 illustrated in FIG. 1 is a processor which outputs the electrical properties obtained by simulations executed by simulation execution unit 40. Result output unit 50 outputs, for example, the electrical properties obtained by the simulations to display unit 14, so that the electrical properties are displayed on display unit 14. Result output unit 50 may also output, for example, at least one of the throughput and signal-to-noise ratio (SNR) of the PLC network. Result output unit 50 may also output the cost of the PLC devices. Result output unit 50 may output the electrical properties designated by input unit 12 to display unit 14. Specifically, result output unit 50 may display the list of the electrical properties that can be output on display unit 14, so that the user is able to designate at least one of the electrical properties displayed on display unit 14 with input unit 12. Result output unit 50 may obtain the electrical properties obtained by the simulations from result storage 86.

[2. Hardware Configuration]

Figure 5:
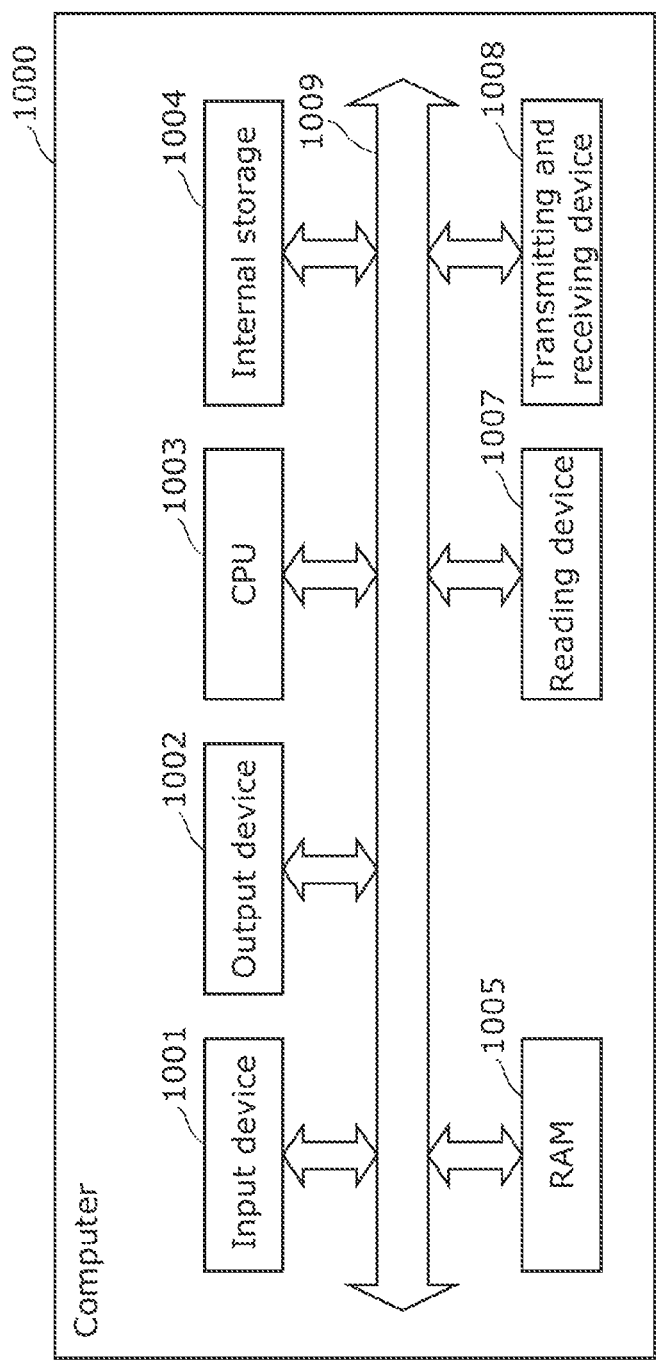
FIG. 5 illustrates an example of a hardware configuration of a computer which implements functions of the simulation device according to the embodiment by software.

Next, a hardware configuration of simulation device 10 according to the present embodiment will be described with reference to FIG. 5. FIG. 5 illustrates an example of a hardware configuration of computer 1000 which implements the functions of simulation device 10 according to the present embodiment by software.

As illustrated in FIG. 5, computer 1000 includes input device 1001, output device 1002, CPU 1003, internal storage 1004, RAM 1005, reading device 1007, transmitting and receiving device 1008, and bus 1009. Input device 1001, output device 1002, CPU 1003, internal storage 1004, RAM 1005, reading device 1007, and transmitting and receiving device 1008 are interconnected via bus 1009.

Input device 1001 is a device serving as a user interface, such as a keyboard, a mouse, an input button, a touchpad, or a touch panel display, and receives an operation made by the user. Input device 1001 may receive an operation by voice and a remote operation by a remote controller and the like, in addition to receiving a contact operation made by the user. Input device 1001 is an example of input unit 12 of simulation device 10.

Output device 1002 is a device which outputs a signal from computer 1000, and may be a device serving as a user interface, such as a display, or a speaker, in addition to a signal output terminal. Output device 1002 is an example of display unit 14 of simulation device 10.

Internal storage 1004 is a flash memory. Internal storage 1004 may store in advance at least one of a program for implementing the functions of simulation device 10 and an application that uses the functional configuration of simulation device 10. Internal storage 1004 is an example of storage 18 of simulation device 10. At least part of storage 18 does not have to be included in computer 1000.

RAM 1005 is a random access memory (RAM), and is used for storing data and the like when a program or an application is executed.

Reading device 1007 reads information from a recording medium such as a universal serial bus (USB) memory. Reading device 1007 reads the program or application from a recording medium on which the above described program or application is recorded, and stores the read program or application in internal storage 1004. At least part of storage 18 of simulation device 10 may be implemented by, for example, an external storage such as a USB memory to be connected to reading device 1007.

Transmitting and receiving device 1008 is a communication circuit for performing wired or wireless communication. Transmitting and receiving device 1008 downloads the above described program or application from the server device by performing communication with a server device connected to the network, for example, and stores the downloaded program or application in internal storage 1004. At least part of storage 18 of simulation device 10 may be implemented by a server device connected to the network, for example.

CPU 1003 is a central processing unit (CPU). CPU 1003 copies the program, application, and the like stored in internal storage 1004 to RAM 1005, and sequentially reads commands included in the copied program, application and the like from RAM 1005 for execution.

[3. Simulation Method]

Figure 6:
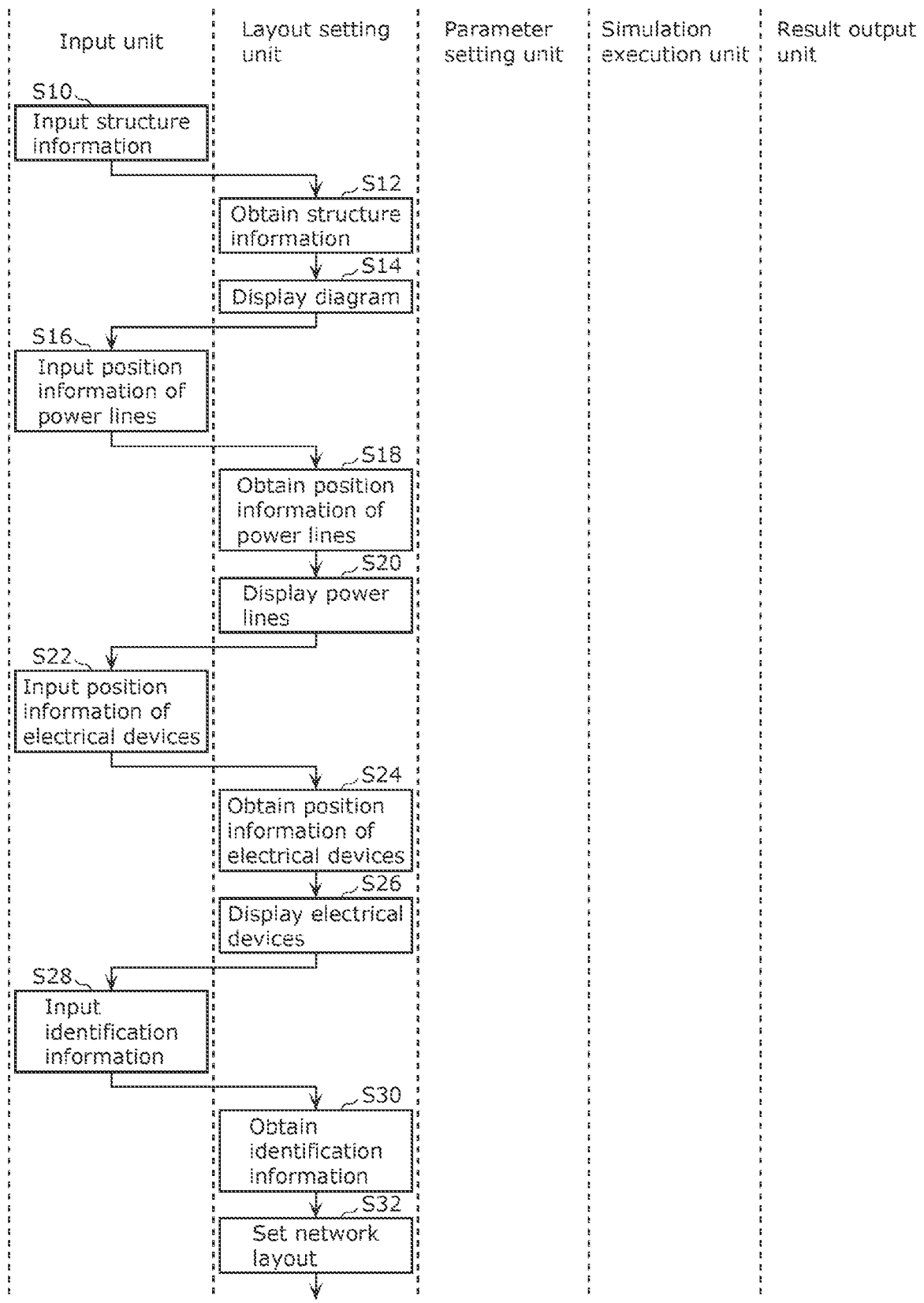
FIG. 6 is a first flowchart of a simulation method according to the embodiment.
Figure 7:
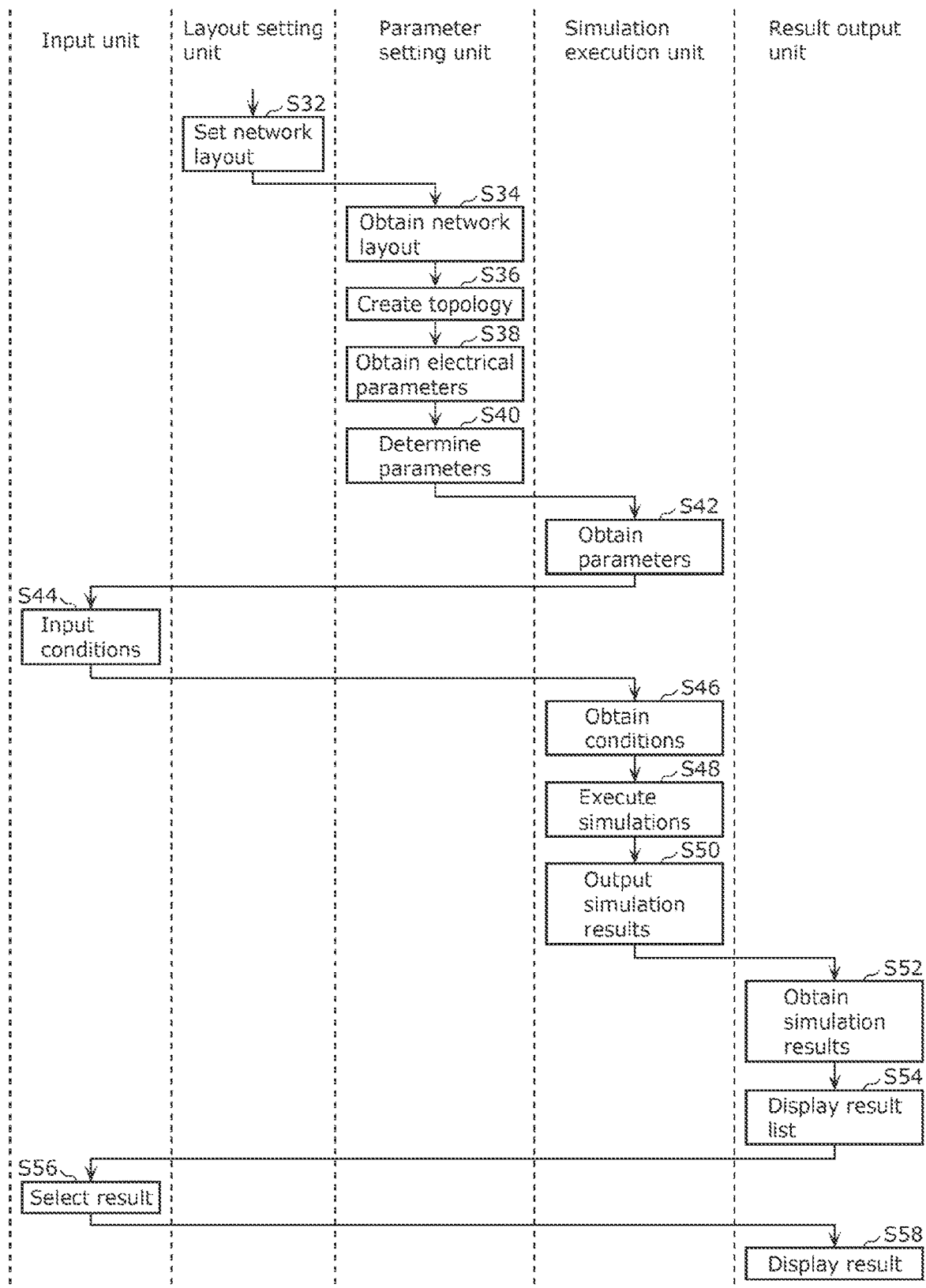
FIG. 7 is a second flowchart of the simulation method according to the embodiment.

Next, a simulation method used in simulation device 10 according to the present embodiment will be described with reference to FIG. 6 and FIG. 7. FIG. 6 and FIG. 7 are first and second flowcharts of the simulation method according to the present embodiment, respectively.

As illustrated in FIG. 6, first, structure information indicating the structure of a building where the PLC network is to be provided is input from input unit 12 (S10). The structure information is, for example, input by the user with input unit 12. The structure information itself may be input from input unit 12, or information for specifying the structure information stored in input data storage 82 may be input.

Subsequently, information obtaining unit 22 of layout setting unit 20 obtains the structure information (S12). Information obtaining unit 22 may obtain the structure information from input unit 12, or may obtain the structure information from input data storage 82 based on the information for specifying the structure information input from input unit 12.

Figure 8:
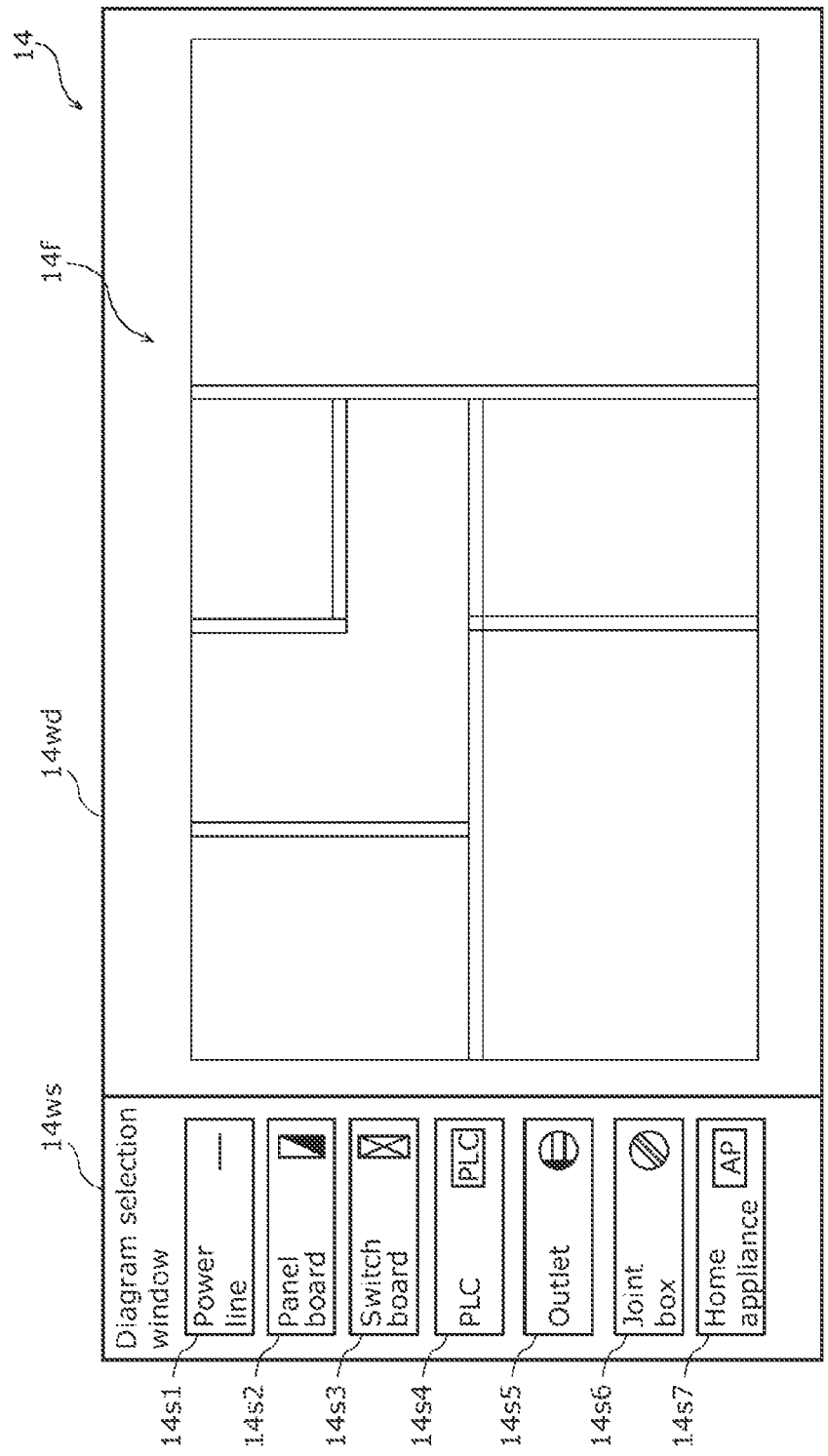
FIG. 8 illustrates an example of an image illustrating a structure of a building displayed on a display unit according to the embodiment.

Subsequently, layout setting unit 20 displays, on display unit 14, a diagram that is based on the structure information (S14). Specifically, building setting unit 26 of layout setting unit 20 sets the structure of the building where the PLC network is to be provided, based on the structure information, and display information output unit 28 displays, on display unit 14, a diagram indicating the structure of the building set based on the structure information. Here, an image displayed on display unit 14 by layout setting unit 20 will be described with reference to FIG. 8. FIG. 8 illustrates an example of an image indicating the structure of the building displayed on display unit 14 according to the present embodiment. As illustrated in FIG. 8, display unit 14 displays diagram selection window 14ws and diagram window 14wd. Diagram window 14wd is a display region in which the structure of a building and a PLC network are drawn. As illustrated in FIG. 8, for example, layout plan 14f of the building is displayed in diagram window 14wd of display unit 14 based on the structure information, for example. Diagram selection window 14ws is a display region for selecting the elements included in the PLC network. In diagram selection window 14ws, selection buttons 14s1 to 14s7 for selecting and drawing a diagram of power lines, electrical devices and the like that can be the elements included in the PLC network are displayed. In the example of FIG. 8, in diagram selection window 14ws, selection button 14s1 for selecting a power line, selection button 14s2 for selecting a panel board, selection button 14s3 for selecting a switch board, selection button 14s4 for selecting a PLC device, selection button 14s5 for selecting an outlet, selection button 14s6 for selecting a joint box (registered trademark), and selection button 14s7 for selecting a home appliance.

Referring back to FIG. 6, after step S14, position information of one or more elements included in the PLC network is input from input unit 12 to layout setting unit 20. As the one or more elements, for example, position information of one or more power lines is input (S16). Specifically, it may be that the position information of the power lines is input by the user selecting selection button 14s1 in diagram selection window 14ws illustrated in FIG. 8 with a mouse or the like included in input unit 12. For example, the start point and the end point of the layout position of a power line may be input with a keyboard or the like included in input unit 12 or with a mouse or the like. When the position information of one or more power lines is stored in input data storage 82, information for specifying the position information stored in input data storage 82 may be input from input unit 12. For example, when information corresponding to the electrical wiring system diagram that includes position information of one or more power lines is stored in input data storage 82, information for specifying the electrical wiring system diagram may be input from input unit 12.

Here, position information of power lines will be described with reference to FIG. 9. FIG. 9 illustrates an example of position information and identification information of power lines according to the present embodiment. Each example of the position information of the power lines illustrated in FIG. 9 includes a power line ID, the start point and end point of the layout position of the power line, and a power line model ID. The power line ID is an ID for specifying a power line included in the PLC network. The power line model ID is identification information for identifying an electrical parameter of a power line. The power line model ID may include, for example, a product name and a model number of the power line. Input of the identification information such as the power line model ID will be described later.

Referring back to FIG. 6, after step S16, information obtaining unit 22 of layout setting unit 20 obtains position information of one or more power lines (S18). Information obtaining unit 22 may obtain position information from input unit 12, or obtain position information from input data storage 82 based on the information specifying the position information input from input unit 12.

Figure 10:
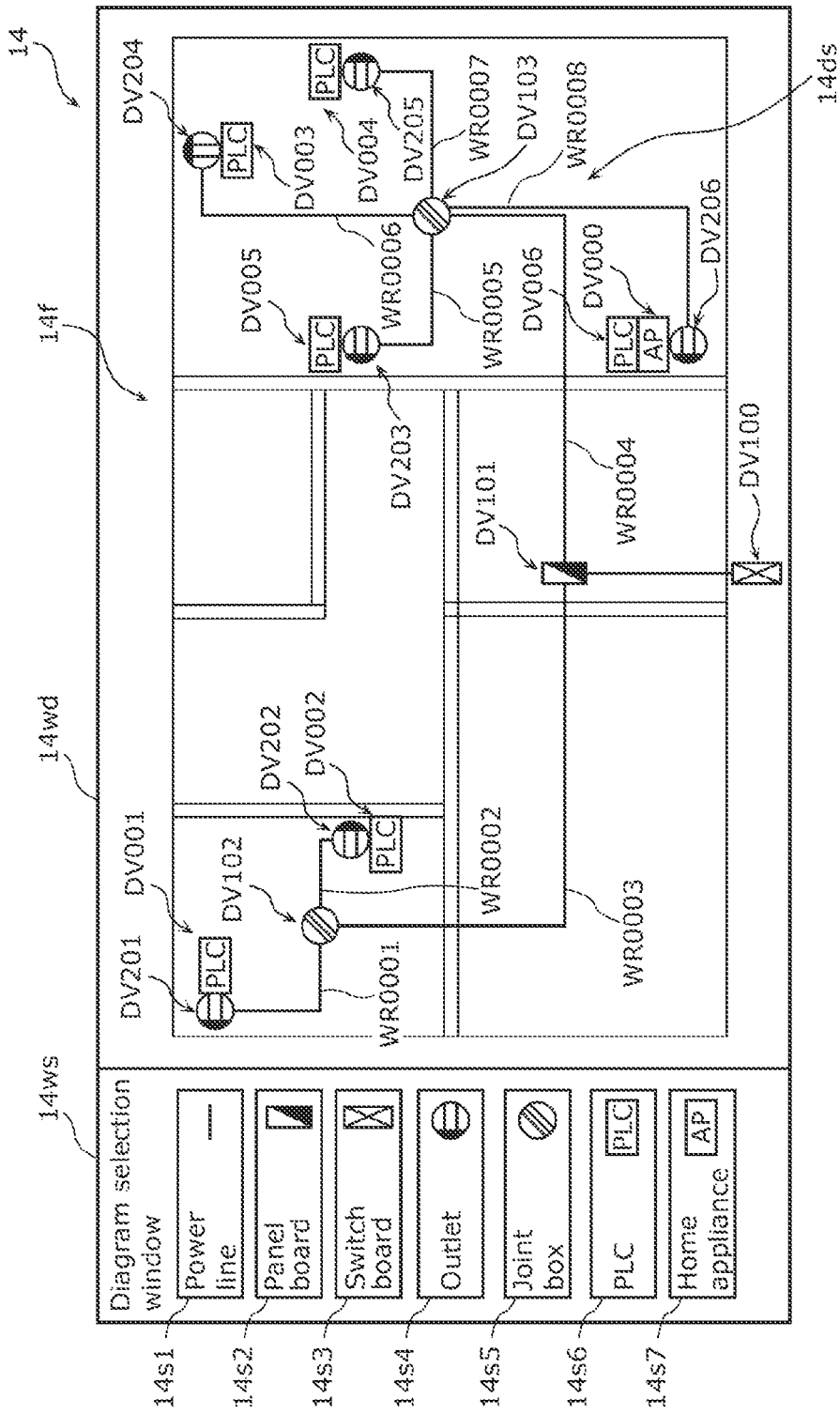
FIG. 10 illustrates layouts of power lines and electrical devices displayed on the display unit according to the embodiment.

Subsequently, layout setting unit 20 displays a diagram that is based on the position information of the one or more power lines on display unit 14 (S20). Specifically, network setting unit 24 of layout setting unit 20 receives position information input from information obtaining unit 22, and outputs the position information to display information output unit 28 as part of the PLC network. Display information output unit 28 displays, on display unit 14, the diagram indicating the positions of one or more power lines set based on the position information, so as to be superimposed on the diagram that is based on the structure information of the building. Here, the diagram indicating the positions of one or more power lines will be described with reference to FIG. 10. FIG. 10 illustrates layout of power lines and electrical devices displayed on display unit 14 according to the present embodiment. As illustrated in FIG. 10, power lines WR0001 to WR0008 included in PLC network 14ds are displayed so as to be superimposed on floor plan 14f displayed in diagram window 14wd of display unit 14. In diagram window 14wd illustrated in FIG. 10, electrical devices DV001 to DV006, DV100 to DV103, and DV201 to DV206 to be described later are also displayed. In such a manner, position information of each power line can be input while displaying power lines WR0001 to WR0008 so as to be superimposed on floor plan 14f. Hence, layout of each power line in the building can be easily set. For example, the position of one end of the wiring of each power line can be easily set, such as the position of the outlet in a wall of the building.

Referring back to FIG. 6, after S20, position information of one or more elements included in the PLC network other than the power lines is input to layout setting unit 20 from input unit 12. As the one or more elements, for example, position information of one or more electrical devices is input (S22). Specifically, it may be that the position information of the electrical devices is input by the user selecting one of selection buttons 14s2 to 14s7 in diagram selection window 14ws illustrated in FIG. 8 with a mouse or the like included in input unit 12. For example, the position of the electrical devices may be input with a keyboard or the like included in input unit 12 or with a mouse or the like. When the position information of one or more electrical devices is stored in input data storage 82, information for specifying the position information stored in input data storage 82 may be input from input unit 12.

Here, the position information of electrical devices will be described with reference to FIG. 11. FIG. 11 illustrates examples of position information and identification information of electrical devices according to the present embodiment. Each of the examples of the position information of the electrical devices illustrated in FIG. 11 includes an electrical device ID, coordinates indicating the layout position of each electrical device, and an electrical device model ID. The electrical device ID is an ID for specifying the electrical device included in the PLC network. The electrical device model ID is identification information for identifying electrical parameters of each electrical device. Examples of the electrical device model ID include a product name and a model number of each electrical device.

Referring back to FIG. 6, after step S22, information obtaining unit 22 of layout setting unit 20 obtains position information of one or more electrical devices (S24). Information obtaining unit 22 may obtain position information from input unit 12, or may obtain the position information from input data storage 82 based on the information for specifying the position information input from input unit 12.

Subsequently, layout setting unit 20 displays, on display unit 14, a diagram that is based on the position information of the one or more electrical devices (S26). Specifically, network setting unit 24 of layout setting unit 20 receives position information input from information obtaining unit 22, and outputs the position information as part of the PLC network to display information output unit 28. Display information output unit 28 displays, on display unit 14, the diagram indicating the positions of one or more electrical devices set based on the position information, so as to be superimposed on the diagram that is based on the structure information of the building. Here, the diagram indicating the positions of the one or more electrical devices will be described with reference to FIG. 10. As illustrated in FIG. 10, electrical devices DV001 to DV006, DV100 to DV103, DV201 to DV206 are displayed so as to be superimposed on floor plan 14f displayed in diagram window 14wd of display unit 14. In such a manner, since position information of each electrical device can be input while displaying, on display unit 14, each electrical device so as to be superimposed on floor plan 14f, the layout of each electrical device in the building can be easily set. For example, among the electrical devices, the position of outlets (see electrical devices DV201 to DV206 illustrated in FIG. 10) can be easily set so as to correspond to the positions of the walls and the like of the building. In addition, among the electrical devices, the position of a home appliance (see electrical device DV000 illustrated in FIG. 10) can be set intuitively in accordance with the floor plan of the building.

Referring back to FIG. 6, after step S26, identification information of one or more elements included in the PLC network is input from input unit 12 to layout setting unit 20 (S28). For example, the user selects each element displayed on display unit 14 with a mouse or the like included in input unit 12 and inputs identification information of the selected element. Accordingly, layout setting unit 20 obtains the input identification information (S30).

Figure 12:
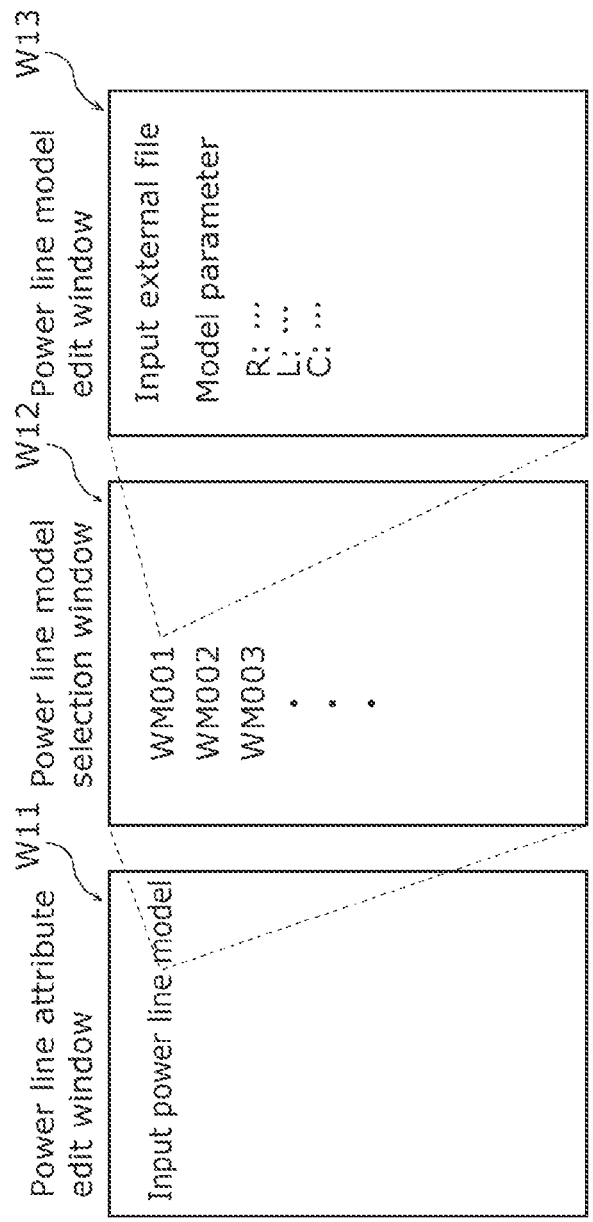
FIG. 12 illustrates an example of an input method of identification information of a power line included in the PLC network according to the embodiment.
Figure 13:
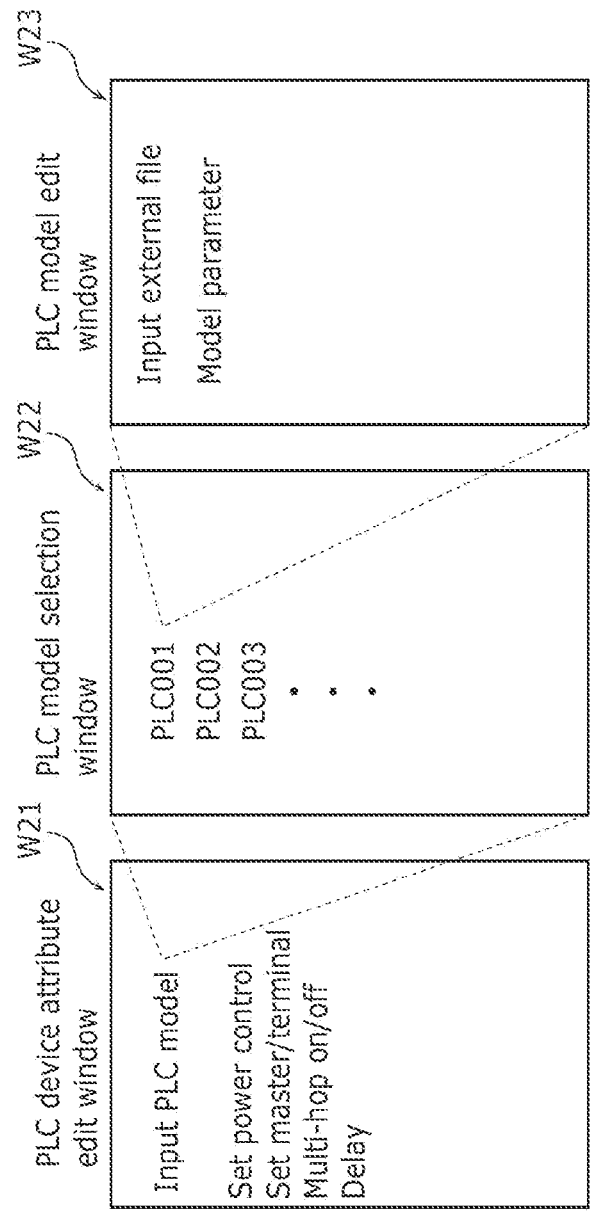
FIG. 13 illustrates an example of an input method of identification information of a PLC device included in the PLC network according to the embodiment.

Here, as examples of the elements, a method of inputting identification information of the power lines and the PLC devices will be described with reference to FIG. 12 and FIG. 13. FIG. 12 and FIG. 13 each illustrate an example of an input method of identification information of the power lines and the PLC devices included in the PLC network according to the present embodiment.

When identification information of a power line is input, and, for example, one of the power lines included in the PLC network displayed on display unit 14 is selected with a mouse or the like, power line attribute edit window W11 as illustrated in FIG. 12 is displayed. In power line attribute edit window W11, an input field for setting the attribute of a power line, such as a power line model input field, is displayed. By selecting the power line model input field in power line attribute edit window W11 with a mouse or the like, power line model selection window W12 as illustrated in FIG. 12 is displayed. In power line model selection window W12, one or more power line model IDs which are examples of identification information are displayed. Information of the one or more power line model IDs is stored, for example, in input data storage 82, and layout setting unit 20 obtains the information from input data storage 82.

Subsequently, by selecting the power line model ID corresponding to the selected power line from power line model selection window W12 with a mouse or the like, a power line model ID which is the identification information of the power line can be input. When the power line model ID is selected, power line model edit window W13 as illustrated in FIG. 12 may be displayed. Power line model edit window W13 is an input field for editing electrical parameters of a power line. Accordingly, when the power line model ID which corresponds to the power line is not displayed in power line model selection window W12, the electrical parameters of the power line can be edited to appropriate values by editing the electrical parameters of another power line model ID. Power line model edit window W13 includes, for example, an external file input field and a model parameter field. By designating, in the external file input field, a file stored in input data storage 82 or the like, the electrical parameters of a power line can be set to the electrical parameters stored in the file. The electrical parameters are displayed in the model parameter field, so that each electrical parameter can be edited by input unit 12.

When identification information of a PLC device is input, and, for example, one of the PLC devices included in the PLC network displayed on display unit 14 is selected with a mouse or the like, PLC device attribute edit window W21 as illustrated in FIG. 13 is displayed. In PLC device attribute edit window W21, an input field for setting the attribute of the PLC device, such as a PLC model input field is displayed. As illustrated in FIG. 13, PLC device attribute edit window W21 may include an input field for inputting setting of the PLC device such as power control setting, master/terminal setting, multi-hop on/off, or delay.

By selecting the PLC model input field in PLC device attribute edit window W21 with a mouse or the like, PLC model selection window W22 as illustrated in FIG. 13 is displayed. In PLC model selection window W22, one or more PLC model IDs which are examples of the identification information are displayed. By selecting a PLC model ID corresponding to the selected PLC device from PLC model selection window W22 with a mouse or the like, a PLC model ID which is the identification information of the PLC device can be input. When the PLC model ID is selected, PLC model edit window W23 as illustrated in FIG. 13 may be displayed. PLC model edit window W23 is an input field for editing electrical parameters of a PLC device. Accordingly, when a PLC model ID which corresponds to the PLC device is not displayed in PLC model selection window W22, the electrical parameters of the PLC device can be edited to appropriate values by editing the electrical parameters of another PLC model ID. In a similar manner to power line model edit window W13 illustrated in FIG. 12, PLC model edit window W23 includes an external file input field, a model parameter field, and the like. The electrical parameters of the PLC devices can also be edited in a similar manner to the electrical parameters of the power lines.

Figure 14:
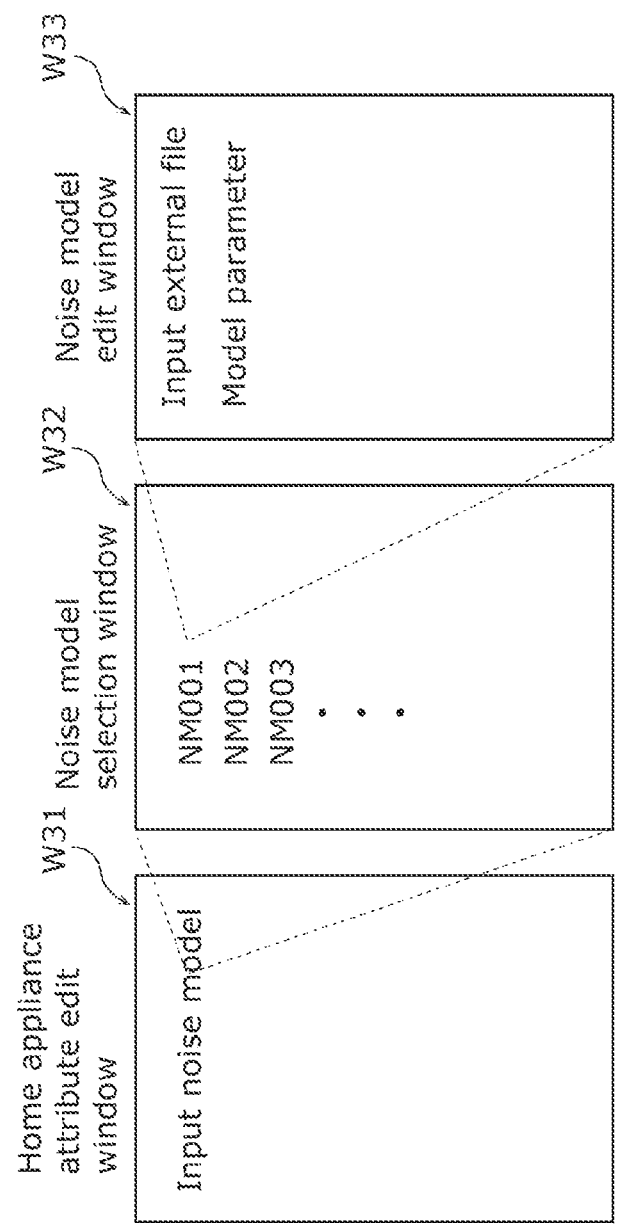
FIG. 14 illustrates an example of an input method of a noise model of a home appliance according to the embodiment.

In addition, for example, a parameter other than the identification information of the electrical device included in the PLC network may be input. For example, a noise model of a home appliance may be input. Here, a method of inputting a noise model of a home appliance will be described with reference to FIG. 14. FIG. 14 illustrates an example of an input method of a noise model of a home appliance according to the present embodiment. When the noise model of a home appliance is input, and, for example, one home appliance included in the PLC network displayed on display unit 14 is selected with a mouse or the like, home appliance attribute edit window W31 as illustrated in FIG. 14 is displayed. In home appliance attribute edit window W31, an input field for setting the parameters of a home appliance, such as a noise model input field, is displayed.

By selecting the noise model input field in home appliance attribute edit window W31 with a mouse or the like, noise model selection window W32 as illustrated in FIG. 14 is displayed. In noise model selection window W32, one or more noise model IDs are displayed. By selecting a noise model ID corresponding to the selected home appliance from noise model selection window W32 with a mouse or the like, a noise model ID corresponding to the noise model of the home appliance can be input. When the noise model ID is selected, noise model edit window W33 as illustrated in FIG. 14 may be displayed. Noise model edit window W33 is an input field for editing the noise model corresponding to the noise model ID of the home appliance. Accordingly, when the noise model ID corresponding to the noise model of the home appliance is not displayed in noise model selection window W32, the noise model of the home appliance can be edited to an appropriate model by editing the parameters corresponding to another noise model ID. In a similar manner to power line model edit window W13 as illustrated in FIG. 12, noise model edit window W33 includes an external file input field, a model parameter field, and the like. The noise model ID of the home appliance can also be edited in a similar manner to the electrical parameters of the power lines.

While examples of the methods of inputting identification information of the power lines and the PLC devices have been described, identification information of other electrical devices can also be input in a similar manner.

Referring back to FIG. 6, after S30, layout setting unit 20 sets the layout of the PLC network based on the obtained position information, identification information and the like (S32). Specifically, the identification information of one or more elements included in the PLC network, the position information of each element, and the connection states between the elements are set. Layout setting unit 20 outputs the information that relates to the set layout of the PLC network to parameter setting unit 30. As described above, when the electrical parameters and the like of each element are edited, the edited electrical parameters are also output to parameter setting unit 30.

Next, as illustrated in FIG. 7, parameter setting unit 30 obtains information that relates to the layout of the PLC network from layout setting unit 20 (S34).

Next, parameter setting unit 30 creates a PLC network topology based on the information that relates to the layout of the PLC network (S36). Specifically, topology creator 34 of parameter setting unit 30 creates a topology which includes the length of each branch of the PLC network including power lines and connection relationship between each branch and another branch, based on the information that relates to the PLC network layout. Here, the topology created by topology creator 34 will be described with reference to FIG. 15. FIG. 15 is a graph illustrating a portion of the topology of the PLC network according to the present embodiment. As illustrated in FIG. 15, topology creator 34 sets a branch ID indicating a branch included in the topology, the power line length, the electrical device or branch connected to each end of the branch, and a power line model ID which is an example of the identification information of the power line of the branch.

Next, parameter setting unit 30 then obtains electrical parameters of each of one or more elements included in the PLC network (S38). Specifically, electrical parameter obtaining unit 32 of parameter setting unit 30 obtains the electrical parameters of one or more elements from parameter storage 84, based on the one or more items of identification information obtained by layout setting unit 20. Here, the electrical parameters stored in parameter storage 84 will be described with reference to FIG. 16 and FIG. 17. FIG. 16 and FIG. 17 illustrate the electrical parameters of the power lines and the electrical devices included in the PLC network stored in parameter storage 84 according to the present embodiment, respectively. As illustrated in FIG. 16 and FIG. 17, parameter storage 84 stores electrical parameters of one or more elements respectively associated with the one or more items of identification information. As the electrical parameters of the power lines, for example, as illustrated in FIG. 16, ABCD parameters (in other words, F parameters) are stored. As the electrical parameters of the electrical devices, for example, as illustrated in FIG. 17, impedance, S (scattering) parameter, noise expression and the like are stored. As illustrated in FIG. 17, parameter storage 84 may also store the device type information of each electrical device. For example, as the device type information of the electrical devices with device model IDs illustrated in FIG. 17 that are DM000 and DM001, an air conditioner and a television are stored, respectively.

In addition, electrical parameter obtaining unit 32 of parameter setting unit 30 may obtain parameters set in the respective electrical devices. For example, the parameters set in the PLC devices may be obtained. Here, the parameters set in the PLC devices stored in parameter storage 84 will be described with reference to FIG. 18 and FIG. 19. FIG. 18 illustrates parameters set in each PLC device stored in parameter storage 84 according to the present embodiment. FIG. 19 illustrates parameters of each power control ID stored in parameter storage 84 according to the present embodiment.

As illustrated in FIG. 18, as the parameters set in the PLC devices, for example, the power control IDs, the setting states of the master or terminal, and the setting state of on or off of the multi-pop are stored in parameter storage 84. These parameters may be changed by input unit 12 and the like. In addition, the power control ID is an ID indicating a transmission power combination in each carrier as illustrated in FIG. 19.

As described above, the electrical parameters stored in parameter storage 84 are obtained by electrical parameter obtaining unit 32.

Referring back to FIG. 7, after step S38, parameter setting unit 30 determines the parameters of the PLC network (S40). Specifically, parameter determination unit 36 of parameter setting unit 30 determines the parameters including the topology and the electrical parameters of the PLC network, based on the obtained electrical parameters and the created topology.

Next, simulation execution unit 40 obtains the parameters of the PLC network from parameter setting unit 30 (S42). Specifically, condition obtaining unit 42 of simulation execution unit 40 obtains the parameters to be used in the simulations from parameter setting unit 30.

Figure 20:
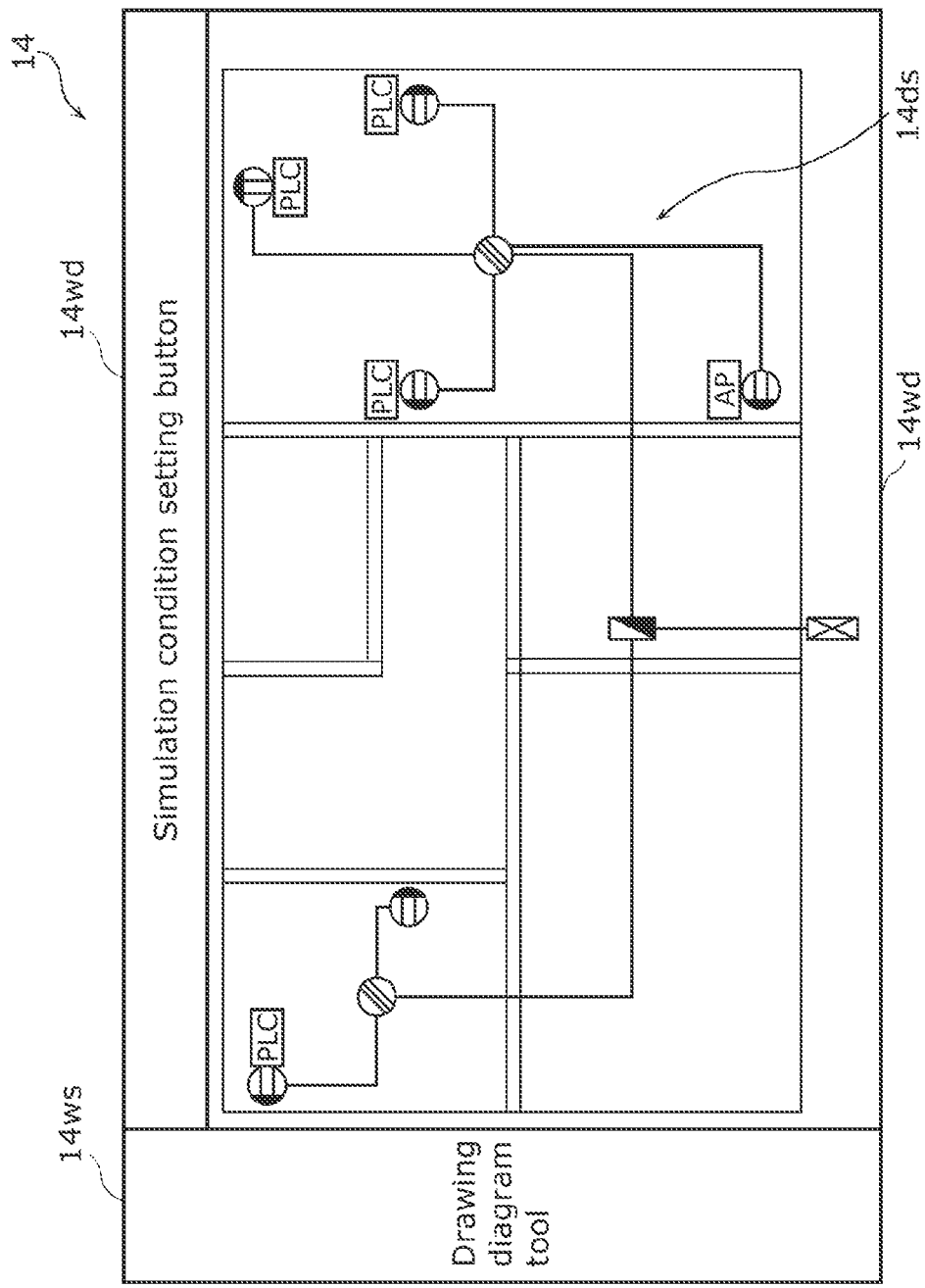
FIG. 20 illustrates an example of an image displayed on the display unit when conditions for simulations are input according to the embodiment.

Next, the conditions for the simulations are input from input unit 12 to simulation execution unit 40 (S44). Specifically, as the conditions for the simulations, an algorithm to be used in the simulations, a required specification of the PLC network, and the like are included. As the conditions for the simulations, parameters set in the electrical devices such as PLC devices may be included. Here, the input method of the conditions for the simulation will be described with reference to FIG. 20 and FIG. 21. FIG. 20 illustrates an example of an image displayed on display unit 14 when conditions for the simulations are input according to the present embodiment. FIG. 21 illustrates an example of an input method of conditions for the simulations according to the present embodiment.

In the present embodiment, as illustrated in FIG. 20, simulation execution unit 40 displays, on display unit 14, a simulation condition setting button and the like that is a button for starting input of conditions for the simulations. The user is able to start input of the conditions for the simulations by, for example, selecting the simulation condition setting button with a mouse or the like. When the simulation condition setting button is selected, simulation execution unit 40 displays, for example, a condition setting window as illustrated in FIG. 21 on display unit 14. In the condition setting window, various conditions for the simulations are displayed. In the example illustrated in FIG. 21, an algorithm and a required throughput to be used in the simulations are displayed. For example, in the example illustrated in FIG. 21, in the condition setting window, a list of algorithms and a required throughput are displayed. The list of the algorithms illustrated in FIG. 21 includes three algorithms that can be used in the simulations. By selecting one algorithm in the algorithm list illustrated in FIG. 21 with a mouse or the like, for example, an algorithm to be used in the simulations can be designated. Selection of a required throughput input field with a mouse or the like activates the state where the value of the required throughput can be input, so that a desired value can be input with a keyboard or the like.

Referring back to FIG. 7, after step S44, condition obtaining unit 42 of simulation execution unit 40 obtains the conditions for the simulations input by the input unit (S46).

Next, execution unit 44 of simulation execution unit 40 executes simulations based on the parameters of the PLC network and the conditions for the simulations obtained by condition obtaining unit 42 (S48).

Next, execution unit 44 of simulation execution unit 40 outputs the simulation results to at least one of result storage 86 and result output unit 50 (S50). In the present embodiment, execution unit 44 outputs the electrical properties obtained through the simulations to both result storage 86 and result output unit 50. Here, the simulation results output by execution unit 44 will be described with reference to FIG. 22 to FIG. 24. FIG. 22 illustrates an example of the simulation results output by simulation execution unit 40 according to the present embodiment. FIG. 23 and FIG. 24 illustrate examples of SNR and throughput included in the simulation results output by simulation execution unit 40 according to the present embodiment, respectively. As illustrated in FIG. 22, the result is output for each simulation condition ID indicating the conditions under which the simulation was executed, and each result has a result ID for specifying the result. In the example illustrated in FIG. 22, the simulation result includes a SNR and a throughput. For example, the result ID of the simulation result with a simulation condition ID that is CD001 is S001. The SNR included in the simulation result has an SNRID that is SN001, and the throughput included in the simulation result has a throughput ID that is TH001. As illustrated in FIG. 23, the SNR included in the simulation result is associated with a SNRID. In addition, in the example illustrated in FIG. 23, the simulation result of the SNR between one pair of PLC devices is associated with a SNRID. The SNR is indicated as a power (dBm) in each frequency of a signal and noise. In addition, as illustrated in FIG. 24, the throughput included in the simulation result is associated with the throughput ID. In the example illustrated in FIG. 24, the simulation result of the throughput between a pair of PLC devices is associated with a throughput ID. In such a manner, the table in which the result ID, simulation condition ID, SNRID, and throughput ID are associated with each other and the table indicating the SNR and the throughput that are the specific simulation result are output as the simulation result. Other simulation results may be output. For example, when the throughput is less than the required throughput, the number of PLC devices required to be added to satisfy the required throughput may be output. The number of PLC devices is obtained by, for example, simulation execution unit 40. The simulation execution unit may obtain the number of PLC devices required and the layout of the PLC devices by adding the PLC device to the branch between a pair of PLC devices which does not satisfy the required throughput and repeatedly executing the simulations till the required throughput is satisfied.

Moreover, when the simulation conditions do not include the layout of the PLC devices, simulation execution unit 40 may determine the layout of the PLC devices and output the determined layout of the PLC devices as part of the simulation result. For example, the simulation execution unit arranges one PLC device for each branch included in the PLC network, executes a simulation, and repeatedly adds a PLC device to the branch between a pair of PLC devices which does not satisfy the required throughput till the required throughput is satisfied, so that the number of required PLC devices and the layout of the PLC devices may be obtained. As the simulation result, cost of the PLC devices and the like may be output.

Next, result output unit 50 obtains the simulation results from simulation execution unit 40 (S52). Result output unit 50 may obtain the simulation results from simulation execution unit 40, or from result storage 86.

Next, result output unit 50 displays, on display unit 14, the result list including the list of the electrical properties obtained through the simulations (S54). For example, result output unit 50 displays the result list that includes, for example, SNR, throughput, the number of PLC devices, and the cost of the PLC devices.

Next, items of the result to be displayed are selected by input unit 12 from among the result list (S56). Specifically, the user is able to select the items of the result to be displayed by selecting the electrical properties and the like included in the result list displayed on display unit 14 with a mouse or the like.

Figure 25:
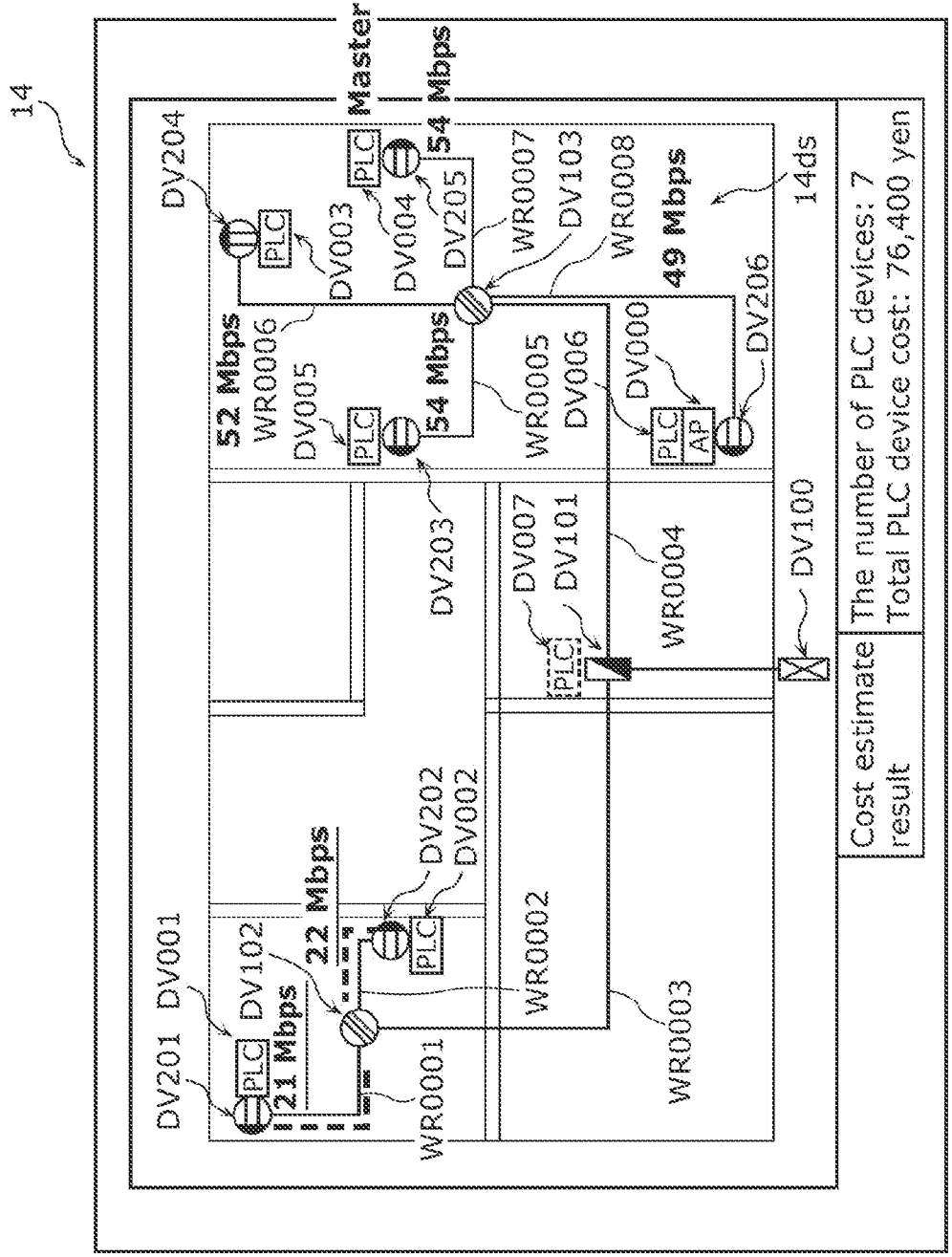
FIG. 25 illustrates an example of a display mode of a simulation result according to the embodiment.

Next, result output unit 50 displays the result selected by input unit 12 on display unit 14 (S58). For example, when the throughput is selected from the result list, result output unit 50 selects the throughput from the results output by simulation execution unit 40 and displays the selected throughput on display unit 14. Result output unit 50 may display the simulation results in the form of tables, graphs or the like, or together with the diagram of the PLC network. Here, the display mode of the simulation results will be described with reference to FIG. 25. FIG. 25 illustrates an example of a display mode of the simulation results according to the present embodiment. As illustrated in FIG. 25, the diagram of the PLC network and the simulation results may be displayed together on display unit 14. In the example illustrated in FIG. 25, the value of the throughput of each branch of the PLC network is displayed on each branch. Such a display allows the relationship between the throughputs and the PLC network to be easily understood. In addition, as in the power lines with power line IDs that are WR001 and WR002 in FIG. 25, the power lines with throughputs that are less than the required throughput may be marked up. In FIG. 25, as mark-up, dashed lines are displayed along the power lines. As illustrated in FIG. 25, among the throughput values, the values that are less than the required throughput may be marked up by, for example, underlines. Accordingly, the portions which do not satisfy the required specification can be easily spotted.

In addition, when the required throughput is not satisfied, the positions to which the PLC devices are to be added may be displayed. In FIG. 25, the PLC device (electrical device DV007) to be added in proximity to the panel board (electrical device DV101) is displayed. Moreover, the PLC devices to be added may be displayed in a display mode different from the PLC devices which have already been laid out. In FIG. 25, the PLC devices which have already been laid out include the solid frames, and the PLC device to be added includes the dashed-line frame.

In addition, as illustrated in FIG. 25, the number of the PLC devices required to satisfy the required throughput and the cost thereof may be displayed on display unit 14.

As described above, by the simulation method according to the present embodiment, even the user who does not have technical knowledge on PLC network, electric wiring, architecture and the like is able to execute simulations of the PLC network easily.

[3. Conclusion]

As described above, simulation device 10 according to the present embodiment calculates the electrical properties of the PLC network. Simulation device 10 includes layout setting unit 20 which sets the layout of the PLC network, parameter setting unit 30 which sets the electrical parameters of the PLC, simulation execution unit 40 which executes simulations of the PLC network, and result output unit 50 which outputs the electrical properties obtained by the simulations executed by simulation execution unit 40. Layout setting unit 20 includes: information obtaining unit 22 which obtains structure information indicating the structure of the building where the PLC network is to be provided and position information of one or more elements included in the PLC network; and display information output unit 28 which displays a diagram that is based on the structure information on display unit 14, and displays at least a portion of the PLC network that is based on the position information such that the portion is superimposed on the diagram.

In such a manner, the PLC network can be displayed so as to be superimposed on the diagram that is based on the structure information of the building, and thus, the layout of the PLC network in the building can be easily set. Accordingly, it is possible even for a user who has no technical knowledge on electrical wiring, architecture and the like to easily perform simulations.

In addition, in simulation device 10 according to the present embodiment, a diagram that is based on the structure information may include a floor plan of the building.

With this, since position information of each element can be input while displaying the elements included in the PLC network, such as power lines, so as to be superimposed on the floor plan, layout of each element in the building can be easily set.

Moreover, in simulation device 10 according to the present embodiment, one or more elements included in the PLC network may include one or more electrical devices.

With this, simulations of the PLC network including electrical devices other than power lines can be executed, providing more accurate simulation results.

Moreover, in simulation device 10 according to the present embodiment, the one or more electrical devices included in the PLC network may include one or more PLC devices.

With this, simulations of the PLC network including PLC devices can be executed, providing accurate simulation results in which the electrical properties of the PLC devices are reflected.

Moreover, in simulation device 10 according to the present embodiment, information obtaining unit 22 of layout setting unit 20 may obtain one or more items of identification information corresponding to the one or more elements. Parameter setting unit 30 may set the electrical parameters of one or more elements obtained from parameter storage 84 as the electrical parameters of the PLC network based on the one or more items of identification information obtained by layout setting unit 20. Parameter storage 84 stores the one or more items of identification information and electrical parameters of one or more elements respectively associated with the one or more items of identification information.

With this, the user is able to set the electrical parameters of the PLC network only by inputting identification information of each element without inputting the electrical parameters of each element. Accordingly, simulations can be easily executed.

Moreover, in simulation device 10 according to the present embodiment, each of one or more items of identification information can include the product name of a corresponding element among the one or more elements.

With this, the user is able to set the electrical parameters of each element included in the PLC network only by inputting the product name as the identification information. Accordingly, simulations can be executed easily.

Moreover, in simulation device 10 according to the present embodiment, simulation execution unit 40 may perform simulations based on each of a plurality of algorithms.

With this, simulations can be executed by selecting a more appropriate algorithm according to the configuration of the PLC network and the like.

Moreover, in simulation device 10 according to the present embodiment, result output unit 50 may output at least one of the throughput or SNR in the PLC network.

With this, it is possible to verify whether or not the PLC network configuration is appropriate for performing the PLC.

Moreover, in simulation device 10 according to the present embodiment, result output unit 50 may output the cost of the PLC devices.

With this, not only the electrical properties of the PLC network but also the cost can be estimated by the simulations.

Moreover, the simulation method according to the present embodiment is a simulation method for calculating the electrical properties of the PLC network. The method includes setting the layout of a PLC network, setting electrical parameters of the PLC network, executing simulations of the PLC network, and outputting the electrical properties obtained through the execution of the simulations. The setting of the layout includes obtaining structure information indicating a structure of a building where the PLC network is to be provided and position information of one or more elements included in the PLC network, and displaying a diagram that is based on the structure information and displaying at least a portion of the PLC network that is based on the position information such that the portion is superimposed on the diagram.

In such a manner, the PLC network can be displayed so as to be superimposed on the diagram that is based on the structure information of the building, and thus, layout of the PLC network in the building can be easily set. Accordingly, even a user who has no technical knowledge on the electrical wiring, architecture and the like is able to execute simulations easily.

(Variations, etc.)

Although simulation device 10 and the like according to the present disclosure has been described based on the above embodiment, the present disclosure is not limited to such an embodiment. Various modifications of the embodiment as well as embodiments resulting from arbitrary combinations of the structural elements of the embodiment that may be conceived by those skilled in the art are intended to be included within the scope of the present disclosure as long as these do not depart from the essence of the present disclosure.

For example, in the embodiment described above, simulation device 10 includes input unit 12, display unit 14, and storage 18, but simulation device 10 does not have to include those elements. For example, simulation device 10 may be connected to an external input unit, display unit, and storage for use.

Moreover, in the simulation method according to the present embodiment, position information of the power lines and the electrical devices is sequentially input, but the order of the input of the position information is not particularly limited. Moreover, at the time of input of the position information of the power lines and the electrical devices, identification information may also be input together.

Moreover, in the simulation method according to the present embodiment, all the power lines and the electrical devices included in the PLC network are input from input unit 12, but at least part of the power lines and the electrical devices included in the PLC network may be input from input data storage 82. For example, it may be that input data storage 82 stores information corresponding to an electrical wiring system diagram, and that the position information obtained by information obtaining unit 22 of layout setting unit 20 includes information corresponding to the electrical wiring system diagram. Accordingly, the position information input from input unit 12 may be reduced, facilitating the simulations.

Moreover, in the present embodiment, result output unit 50 outputs the simulation result to display unit 14, but the output manner of result output unit 50 is not limited to such an example. For example, result output unit 50 may output the simulation result to a printer or the like.

Moreover, the forms indicated below may be included in one or more aspects of the present disclosure.

(1) part of the elements included in simulation device 10 described above may be a computer system including a microprocessor, a ROM, a RAM, a hard disk unit, a display unit, a keyboard, a mouse and the like. The RAM or the hard disk unit stores a computer program. The function is achieved by the microprocessor operating according to the computer program. Here, a computer program is formed of combinations of instruction codes indicating commands to a computer to achieve a predetermined function.

(2) Part of the elements included in simulation device 10 described above may be configured by a single system large scale integration (LSI) circuit. The system LSI is an ultra-multifunctional LSI manufactured by integrating a plurality of elements on a single chip, and specifically, is a computer system including a microprocessor, a ROM, a RAM and the like. A computer program is recorded in the RAM. The system LSI achieves its function by the microprocessor operating according to the computer program.

(3) Part of the elements included in simulation device 10 described above may be configured with an integrated circuit (IC) card that is removable from each device or a single module. The IC card or module is a computer system including a microprocessor, a ROM, a RAM and the like. The IC card or module may include the above-mentioned ultra-multifunctional LSI. The IC card or module achieves its function by the microprocessor operating according to the computer program. The IC card or module may be tamper resistant.

(4) Part of the elements included in simulation device 10 described above may be a computer-readable recording medium, such as a flexible disk, a hard disk, a CD-ROM, a MO, a DVD, a DVD-ROM, a DVD-RAM, a BD (Blu-ray (registered trademark) Disc), and a semiconductor memory, which can read the above computer program or the digital signal by a computer. Moreover, it may be the digital signal recorded on these recording media.

Part of the elements included in simulation device 10 described above may transmit the above computer program or digital signal via an electronic communication line, a wireless or wired communication line, a network represented by the Internet, a data broadcast, or the like.

(5) The present disclosure may be the method described above. Moreover, the method may be a computer program implemented by a computer or a digital signal configured from the computer program. Moreover, the present disclosure may be implemented as a non-transitory computer readable recording medium such as a CD-ROM in which the computer program is recorded.

(6) Moreover, the present disclosure may be a computer system including a microprocessor and a memory in which the memory records the computer program and the microprocessor operates according to the computer program.

(7) Alternatively, the program or the digital signal may be recorded on a recording medium and transferred, or the program or the digital signal may be transferred via a network or the like to be implemented by another independent computer system.

(8) The above embodiment and variations may be combined.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used, for example, as a simulation device for designing a PLC network to be provided in a building.

The invention claimed is:

1. A simulation device which calculates an electrical property of a power line communication (PLC) network, the simulation device comprising:
a layout setting unit which sets a layout of the PLC network;

a parameter setting unit which sets an electrical parameter of the PLC network;

a simulation execution unit which executes a simulation of the PLC network; and a result output unit which outputs the electrical property obtained by the simulation executed by the simulation execution unit, wherein the layout setting unit includes:

an information obtaining unit which obtains structure information and position information, the structure information indicating a structure of a building where the PLC network is to be provided, the position information indicating a position of each of one or more elements included in the PLC network; and a display information output unit which displays, on a display unit that displays information that relates to the PLC network, a diagram that is based on the structure information, and displays at least a portion of the PLC network that is based on the position information such that the portion is superimposed on the diagram.

2. The simulation device according to claim 1, wherein the diagram includes a floor plan of the building.

3. The simulation device according to claim 1, wherein the position information includes information corresponding to an electrical wiring system diagram.

4. The simulation device according to claim 1, wherein the one or more elements include one or more electrical devices.

5. The simulation device according to claim 4, wherein the one or more electrical devices include one or more PLC devices which perform power line communication.

6. The simulation device according to claim 5, wherein the result output unit outputs a cost of the one or more PLC devices.

7. The simulation device according to claim 1, wherein the information obtaining unit obtains one or more items of identification information respectively corresponding to the one or more elements, and the parameter setting unit sets, based on the one or more items of identification information obtained by the layout setting unit, an electrical parameter of each of the one or more elements obtained from a parameter storage as the electrical parameter of the PLC network, the parameter storage storing the one or more items of identification information and the electrical parameter of each of the one or more elements respectively associated with the one or more items of identification information.

8. The simulation device according to claim 7, wherein each of the one or more items of identification information includes a product name of a corresponding one of the one or more elements.

9. The simulation device according to claim 1, wherein the simulation execution unit is capable of executing the simulation based on each of a plurality of algorithms.

10. The simulation device according to claim 1, wherein the result output unit outputs at least one of a throughput or a signal-to-noise ratio of the PLC network.

11. A simulation method for calculating an electrical property of a power line communication (PLC) network, the simulation method comprising:

setting a layout of the PLC network;

setting an electrical parameter of the PLC network;

executing a simulation of the PLC network; and outputting the electrical property obtained by the executing of the simulation, wherein the setting of the layout includes:

obtaining structure information and position information, the structure information indicating a structure of a building where the PLC network is to be provided, the position information indicating a position of each of one or more elements included in the PLC network; and displaying a diagram that is based on the structure information, and displaying at least a portion of the PLC network that is based on the position information such that the portion is superimposed on the diagram.

12. A non-transitory computer-readable recording medium for use in a computer, the recording medium having a computer program recorded thereon for causing the computer to execute the simulation method according to claim 11.

* * * * *